(12) United States Patent
Larson et al.

(10) Patent No.: US 7,467,128 B2
(45) Date of Patent: Dec. 16, 2008

(54) MAINTENANCE OF MATERIALIZED OUTER-JOIN VIEWS

(75) Inventors: Per-Ake Larson, Redmond, WA (US); Jingren Zhou, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 264 days.

(21) Appl. No.: 11/354,375

(22) Filed: Feb. 15, 2006

(65) Prior Publication Data

US 2007/0192283 A1 Aug. 16, 2007

(51) Int. Cl.
*G06F 17/30* (2006.01)

(52) U.S. Cl. .......................................... 707/2

(58) Field of Classification Search ................ 707/2, 707/3, 4; 345/440
See application file for complete search history.

(56) References Cited

U.S. PATENT DOCUMENTS

| | | | |
|---|---|---|---|
| 5,197,005 A * | 3/1993 | Shwartz et al. ................ 707/2 |
| 5,548,758 A | 8/1996 | Pirahesh et al. |
| 5,875,447 A | 2/1999 | Goel et al. |
| 5,991,754 A | 11/1999 | Raitto et al. |
| 5,999,192 A * | 12/1999 | Selfridge et al. ............ 345/440 |
| 6,125,360 A | 9/2000 | Witkowski et al. |
| 6,134,543 A | 10/2000 | Witkowski et al. |
| 6,341,281 B1 | 1/2002 | MacNicol et al. |
| 6,356,890 B1 | 3/2002 | Agrawal et al. |
| 6,385,603 B1 | 5/2002 | Chen et al. |
| 6,438,541 B1 | 8/2002 | Witkowski |
| 6,496,819 B1 | 12/2002 | Bello et al. |
| 6,516,310 B2 | 2/2003 | Paulley |
| 6,581,205 B1 * | 6/2003 | Cochrane et al. ............. 717/140 |
| 6,604,100 B1 * | 8/2003 | Fernandez et al. ............. 707/3 |
| 6,665,663 B2 | 12/2003 | Lindsay et al. |
| 6,732,096 B1 | 5/2004 | Au |

(Continued)

FOREIGN PATENT DOCUMENTS

EP  1193618 A2  3/2002

(Continued)

OTHER PUBLICATIONS

Per-Ake Larson, et al. "View Matching for Outer-Join Views", Proceedings of the 31st VLDB Conference, pp. 445-456. Trondheim, Norway, 2005. Last accessed on Dec. 8, 2005.

(Continued)

*Primary Examiner*—Etienne P LeRoux
(74) *Attorney, Agent, or Firm*—Amin, Turocy & Calvin, LLP

(57) ABSTRACT

Maintenance of materialized view for query optimization in a database. The architecture provides the first practical algorithms for incrementally maintaining views with multiple outer joins and aggregated outer-join views. Materialized views with any combination of inner joins, one-sided outer joins and full outer joins, plus an optional aggregation on top, can be processed by algorithm(s) that construct incremental maintenance expressions based on converting the view definition a join-disjunctive normal form and exploiting database constraints to reduce maintenance overhead. A system comprises a view creation component for creating a materialized view definition that includes outer-joins, a conversion component for converting an outer-join view expression into a normal form, and a maintenance component for updating the stored materialized view result associated with the materialized view definition.

21 Claims, 13 Drawing Sheets

U.S. PATENT DOCUMENTS

| | | | |
|---|---|---|---|
| 6,745,198 | B1 | 6/2004 | Luo et al. |
| 6,763,352 | B2 | 7/2004 | Cochrane et al. |
| 6,850,927 | B1 | 2/2005 | Hsu et al. |
| 6,882,993 | B1 | 4/2005 | Lawande et al. |
| 7,136,850 | B2 * | 11/2006 | Keller et al. .................. 707/4 |
| 2005/0065927 | A1 | 3/2005 | Nouri et al. |

FOREIGN PATENT DOCUMENTS

| | | |
|---|---|---|
| WO | 98/09238 A1 | 3/1998 |
| WO | 2004/072810 A2 | 8/2004 |

OTHER PUBLICATIONS

International Search report for PCT Application No. PCT/US2007/004135, dated Jul. 19, 2007, 3 pages.

Bhargava, et al.; Hypergraph based reorderings of outer join queries with complex predicates; 1995; 12 pages.

Lee, et al; Outer Joins and Filters for Instantiating Objects from Relational Databases Through Views; 1994; 12 pages.

Hosseini; Outerjoin Simplification and Reordering for Query Optimization; Nov. 2, 2005; 16 pages.

* cited by examiner $\{C, O, L\}$ → $\{C, O\}$ → $\{C\}$ (a) $V_1$ $\{C, O, L\}$ → $\{C, O\}$, $\{O, L\}$ → $\{C\}$, $\{O\}$, $\{L\}$ (b) $V_2$

FIG. 3

$\{C, O, L\}^D$ → $\{C, O\}^D$ → $\{C\}^D$ (a) Modify $C$ $\{C, O, L\}^D$ → $\{C, O\}^D$ → $\{C\}^I$ (b) Modify $O$ $\{C, O, L\}^D$ → $\{C, O\}^I$ (c) Modify $L$

FIG. 5

$\{C, O, L\}^D$ → $\{C, O\}^D$, $\{O, L\}^I$ → $\{C\}^D$, $\{O\}^I$ (a) Updating $C$ $\{C, O, L\}^D$ → $\{C, O\}^D$, $\{O, L\}^D$ → $\{C\}^I$, $\{O\}^D$, $\{L\}^I$ (b) Updating $O$

FIG. 8

MAINTENANCE OF MATERIALIZED OUTER-JOIN VIEWS

BACKGROUND

With the advent of the Internet, massive amounts of data are becoming more accessible to large number of users, whether in internal corporate environments or in the public arena such as web-based databases. Accordingly, more efficient and performance-driven requirements are being placed on such systems as the number of user, and consequently, the number and complexity of queries continues to increase.

In a relational database management system, as an example, relationships between data (or files) are created by comparing data, such as account numbers and names. The data being compared and the results can be structured in the form of tables. A join process includes matching records in one table (or file) with records in another, based on some condition, and creating a third table that includes data from the tables being joined. In one example, an Order table can be joined with a Customer table to create a third table for all customers who purchased a particular product.

The default type of join is the inner join, which produces a resulting record whenever two records, one from each input table, satisfy the matching condition. Consider another example that matches shipments with receipts. The join would produce a table of shipments that have been received but omit shipments that have not been received. Contrariwise, an outer join would create a table of every shipment, whether or not it was received. Data for received items is attached to the shipments. Empty (or null) fields would be attached to shipments without receipts.

Materialized views, also called indexed views, are a mechanism for speeding up processing of database queries. A materialized view is a precomputed result that may be used to compute part or all of query instead of computing it directly from base tables. Materialized views can provide dramatic improvements in query processing time. To be useful, a materialized view must be updated when any of its underlying base tables is updated. This is normally referred to as view maintenance. Efficient, incremental view maintenance algorithms are currently known only for SPJG views, that is, views composed of select, project and inner-join operators, with an optional aggregation operator on top, the aggregation operator summarizing the results of the query.

Prior work on incremental maintenance of materialized views has focused primarily on SPJG views but one conventional system provides a mechanism for maintaining outer-join views. However, it does not cover aggregated views, and the mechanism may become grossly inefficient for views with more than a single outer join.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The subject innovation is related to query processing in database systems, and provides the first general and practical algorithms for maintaining outer-join views, including aggregated outer-join views. Materialized views with any combination of selection, projection, inner joins, one-sided outer joins and full outer joins, plus an optional aggregation on top, called SPOJG views, can be handled by the disclosed algorithm(s).

Described herein is an architecture for extending incremental view maintenance to SPOJG views. Extension is by creating one or more algorithms that construct incremental maintenance expressions for SPOJG views. Conventionally, SPOJ expressions can be converted to a normal form, for example, a join-disjunctive normal form. The disclosed algorithm(s) utilize this normal form for outer-join expressions, and also exploit database constraints, for example, foreign-key constraints, to reduce maintenance overhead. Experiments show that maintaining an outer-join view need not be more expensive than maintaining an inner-join view; and for aggregation views it can even be cheaper.

Accordingly, the invention disclosed and claimed herein, in one aspect thereof, comprises a computer-implemented system that facilitates maintenance of materialized outer-join views. The system can comprise a view creation component for creating a materialized view definition that includes outer-joins, a conversion component for converting view expression definition into a normal form, and a maintenance component for updating the stored materialized view result associated with the materialized view definition when an underlying base table is modified.

In another aspect, computations and methodologies are disclosed for identifying directly- and indirectly-affected terms of an expression in normal form as a means for reducing the overhead of view maintenance thereby making expressions more efficient to execute.

In yet another innovative aspect, methodologies are provided for maintaining aggregated views that contain outer joins.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

BRIEF DESCRIPTION OF THE DRAWINGS

FIG. 3 illustrates subsumption graphs for the example SPOJ views $V_1$ and $v_2$.

FIG. 5 illustrates three maintenance graphs for $V_1$ that are derived from the subsumption graph for $V_1$ of FIG. 3.

FIG. 8 illustrates $V_2$ maintenance graphs for updates to table C and for updates to table O.

DETAILED DESCRIPTION

Figure 1:
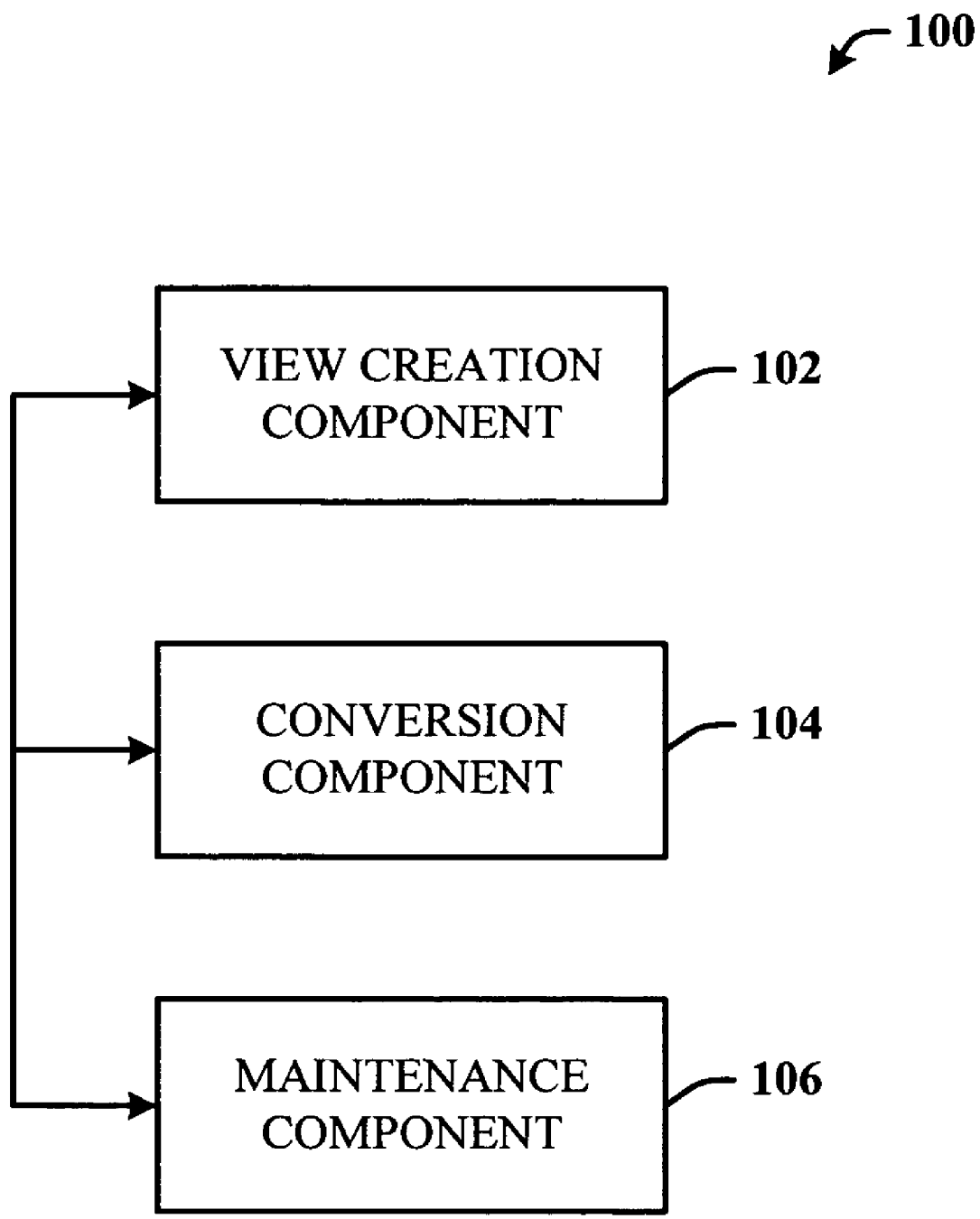
FIG. 1 illustrates a computer-implemented system that facilitates maintenance of a materialized view.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Referring initially to the drawings, FIG. 1 illustrates a computer-implemented system 100 that facilitates maintenance of a materialized view. The system 100 can comprise a view creation component 102 for creating materialized views, including outer-join views, a conversion component 104 for converting view expressions into a normal form, and a maintenance component 106 for updating the materialized views created by the view component 102.

The system facilitates incremental maintenance of materialized SPOJG (or select, projection, outer-join and optional group-by) views, that is, views where some or all of the joins are outer joins. This is accomplished by novel algorithms that construct incremental maintenance expressions for SPOJG views. Conventionally, SPOJ expressions can be converted to a normal form, for example, a join-disjunctive normal form. The conversion component 104 includes one or more algorithm(s) for converting outer-join expressions to this normal form and exploits constraints, for example, foreign-key constraints, to reduce maintenance overhead.

The system 100 provides the first general and practical algorithms for handling views with multiple outer-joins and also aggregated outer-join views. Materialized views with any combination of selections, inner joins, one-sided outer joins and full outer joins, plus an optional aggregation on top, can be handled by the system 100.

Figure 2:
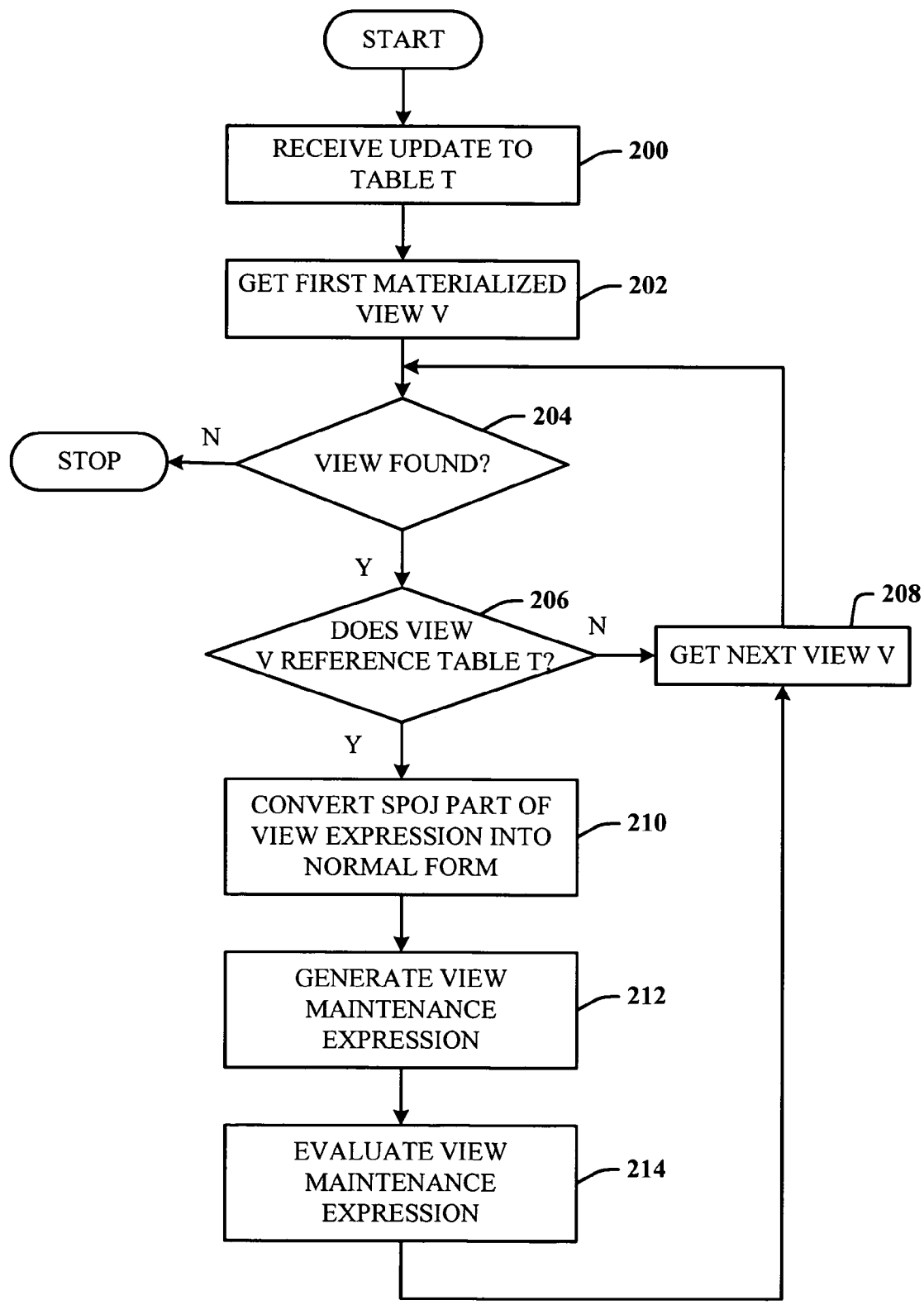
FIG. 2 illustrates a methodology of maintaining a materialized view in accordance with a novel aspect.

FIG. 2 illustrates a methodology of maintaining a materialized view in accordance with a novel aspect. While, for purposes of simplicity of explanation, the one or more methodologies shown herein, e.g., in the form of a flow chart or flow diagram, are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

At 200, updates of a table T are received for processing. The updates consist of a set of new tuples inserted into table T or a set of tuples deleted from table T. At 202, the first view definition V is retrieved to be considered for maintenance. At 204, a check is performed to determine whether all views have been processed. If that is the case, processing terminates. Otherwise, processing continues at 206, where it is determined whether the view references the updated table T. If it does not, the next view is retrieved, in 208, and processing continues at 206. If the view references table T, the SPOJ part of the view definition, i.e., the non-aggregated part of the view definition, is converted into normal from, at 210. At 212, the incremental maintenance expression for the view is generated. At 214, the view maintenance expression is evaluated and the result applied to the view, thereby bringing the view up to date with the base tables. Processing thereafter continues with the next view, at step 208, with flow back to 204.

In operation, consider the following example. A view, oj_view, presented below, consists of outer joins of the tables Part, Lineitem and Orders from a TPC-H (transaction processing performance council, type H benchmark) database. (TPC is an organization that benchmarks transaction processing systems. The TPC-H benchmark measures decision support performance that reflects multiple aspects of system capability to process queries.) It is given that p_partkey is the primary key of Part and o_orderkey is the primary key of Orders, and there is a foreign key constraint between Lineitem and Part, and also one between Lineitem and Orders.

```
create view oj_view as
  select p_partkey, p_name, p_retailprice, o_orderkey, o_custkey,
    l_linenumber, l_quantity, l_extendedprice
  from part left outer join
    (orders left outer join lineitem on l_orderkey =
    o_orderkey) on p_partkey = l_partkey
```

First, analyze what types of tuples the view may contain. The join between Orders and Lineitem will retain all Lineitem tuples because the join matches the foreign key constraint between l_orderkey and o_orderkey. If the Orders table contains some orphaned Orders tuples without matching Lineitem tuples, the orphaned tuples would occur in the result null-extended on all Lineitem columns. The outer join with Part will not eliminate any real {Lineitem, Orders} tuples because this join is also a foreign-key join but it will eliminate all tuples that are null-extended on Lineitem columns. Part tuples that do not join with anything will be retained in the result because the join is an outer join. Hence, the final result will contain one complete {Lineitem, Orders, Part} tuple for each Lineitem tuple and some orphaned Part tuples null-extended on columns from Lineitem and Orders, but no {Lineitem,Orders} and no Orders tuples.

Next, consider how to maintain the view in response to insertions into one of the base tables. Suppose a set of new part tuples is inserted into the Part table. The view can then be brought up-to-date by simply inserting the new part tuples, appropriately extended with nulls, into the view. Nothing more is required because the foreign key constraint between Lineitem and Part guarantees that a new part tuple does not join with any Lineitem tuples. If the new part tuple did, then the joining Lineitem tuples would have violated the foreign key constraint.

Insertions into the Orders table will have no effect on the view so nothing needs to be done. A new Orders tuple cannot join with any existing Lineitem tuples because of the foreign key constraint between Lineitem and Orders. The new Orders tuple, appropriately extended with nulls, will not be contained in the view either because, as discussed above, orphaned Orders tuples are eliminated from the view.

Finally, consider insertions into the Lineitem table. Suppose the new lineitems are contained in a table new_lineitems. The view can then be updated using the following sequence of SQL statements.

```
select p_partkey, p_name, p_retailprice, o_orderkey, o_custkey,
    l_linenumber, l_quantity, l_extendedprice
into #delta1
from new_lineitems, orders, part
where l_orderkey = o_orderkey and l_partkey = p_partkey
insert into oj_view
select ' from #delta1
delete from oj_view
where o_orderkey is null
and p_partkey in (select p_partkey from #delta1)
```

The first statement computes the set of tuples to be inserted into the view and saves them in a temporary table #delta1 (to avoid computing the same expression twice). The second statement adds the new tuples into the view. The new Lineitem tuples may cause some orphaned Part tuples to be eliminated from the view. The third statement deletes all orphaned Part tuples, if any, whose p_partkey value occurs among the newly inserted tuples. In other words, it deletes all orphans who cease to be orphans because of the insert.

The following description contains preliminary material and introduces concepts used later.

A selection operator will be denoted in the normal way as $\sigma_p$, where p is a predicate. A predicate p referencing some set S of columns is said to be strong or null-rejecting if it evaluates to false or unknown on a tuple as soon as one of the columns in S is null. Projection (without duplicate elimination) is denoted by $\pi_c$, where c is a list of columns. Borrowing from SQL (structured query language), the shorthand T.' is used to denote all columns of table T. An operator is also needed that removes duplicates (similar to SQL's select distinct), which is denoted by $\delta$.

A special predicate Null(T) and its negation ~Null(T) will be used. Null(T) evaluates to true if a tuple is null-extended on table T. Null(T) can be implemented in SQL as "T. C is null", where C is any column of T that cannot contain a null value. When applying these predicates to a set of tables T, the predicates NN(T) and N(T) can be used which are defined as $NN(T)=\Lambda_{t \in T} \sim Null(t)$ and $N(T)=\Lambda_{t \in T} Null(t)$.

A schema S is a set of attributes (column names). Let $T_1$ and $T_2$ be tables with schemas $S_1$ and $S_2$, respectively. The outer union, denoted by $T_1 \overline{U} T_2$, first null-extends (pads with nulls) the tuples of each operand to schema $S_1 \oplus S_2$ and then takes the union of the results (without duplicate elimination). Outer (set) difference, denoted by ⊎, is defined in a similar manner.

A tuple $t_1$ is said to subsume a tuple $t_2$ if they are defined on the same schema, $t_1$ agrees with $t_2$ on all columns where they both are non-null, and $t_1$ contains fewer null values than $t_2$. The operator removal of subsumed tuples of T, denoted by Tj, returns the tuples of T that are not subsumed by any other tuple in T.

The minimum union of tables $T_1$ and $T_2$ is defined as $T_1 ö T_2 = (T_1 \overline{U} T_1)j$. Minimum union has lower precedence than join. It can be shown that minimum union is both commutative and associative.

Let $T_1$ and $T_2$ be tables with disjoint schemas $S_1$ and $S_2$, respectively, and p a predicate referencing some subset of the columns in $(S_1 \oplus S_2)$. The (inner) join of the tables is defined as $T_1 \bowtie_p T_2 = \{(t_1,t_2)|t_1 \in T_1, t_2 \in T_2, p(t_1,t_2)\}$. The left semijoin is defined as $T_1 \bowtie_p^{la} T_2 = \{t_1|t_1 \in T_1, (\exists t_2 \in T_2 | p(t_1,t_2))\}$, that is, a tuple in $T_1$ qualifies if it joins with some tuple in $T_2$. The left anti(semi)join is defined as $T_1 \bowtie_p^{la} T_2 = \{t_1|t_1 \in T_1, (\not\exists t_2 \in T_2 | p(t_1,t_2))\}$, that is, a tuple in $T_1$ qualifies if it does not join with any tuple in $T_2$. The left outerjoin can be expressed as $T_1 \bowtie_p^{lo} T_2 = T_1 \bowtie_p T_2 ö T_1$. The right outer join can be expressed as $T_1 \bowtie_p^{ro} T_2 = T_2 \bowtie_p^{lo} T_1$. The full outerjoin can be expressed as $T_1 \bowtie_p^{fo} T_2 = T_1 \bowtie_p T_2 ö T_1 ö T_2$.

As described herein, it is assumed that every base table has a unique key, which is usually the case in practice. All materialized views are assumed to have a unique key and predicates are assumed to be null-rejecting on all columns referenced.

View incremental maintenance expressions are derived based on the join-disjunctive normal form for SPOJ expressions. Throughout this description, the following example database containing three tables will be used as modeled on the tables Customer, Orders, Lineitem of the TPC-H database.

C(<u>ck</u>,cn,cnk),O(<u>ok</u>,ock,od,otp),L(<u>lok,ln</u>,lpk,lq,lp)

Nulls are not allowed in any of the columns. Underlined columns form the key of each table. Two foreign key constraints are defined: O.ock references C.ck and L.lok references O.ok.

Consider an example view having the following definition, $$Q = C \bowtie_{ck=ock}^{lo} (O \bowtie_{ok=lok}^{lo} (\sigma_{lp>500} L))$$

The view contains all customers together with their orders, if any, and line items with a price over 500, if any. The result will contain tuples of three different types.

1. COL-tuples, that is, tuples formed by concatenating a tuple from C, a tuple from O and a tuple from L. There will be one COL-tuple for every L tuple that satisfies the predicate lp>500.
2. CO-tuples, that is, tuples composed by concatenation of a tuple from C, a tuple from O and nulls for all columns of L. There will be one such tuple for every O-tuple that does not join with any L-tuple satisfying lp>500.
3. C-tuples, that is, tuples composed of a tuple from C with nulls for all columns of O and L. There will be one such tuple for every C tuple that does not join with any tuple in O.

The result contains all tuples in the join $C \bowtie_{ck=ock} O \bowtie_{ok=lok} (\sigma_{lp>500} L)$, all tuples in the join $C \bowtie_{ck=ock} O$, and also all tuples in C. Each of these three sub-results is represented in the result in a minimal way. For example, if a tuple ($c_1$,null,null) appears in the result, then there exists a tuple $c_1$ in C, but there is no tuple $o_1$ in O such that ($c_1$,$o_1$) appears in $C \bowtie_{ck=ock} O$.

The expression can be rewritten as the minimum union of three terms comprised solely of inner joins, which is the join-disjunctive form of the original SPOJ expression.

$$Q = (C \bowtie_{ck=ock} O \bowtie_{ok=lok} (\sigma_{lp>500} L)) \ddot{o} (C \bowtie_{ck=ock} O) \ddot{o} (C)$$

As illustrated by the example, an SPOJ expression E over a set of tables U can be converted to a normal form consisting of the minimum union of terms composed from selections and inner joins (but no outer joins). More formally, the join-disjunctive normal form of E can be represented as the following, $$E = \pi C(E_1 \ddot{o} E_2 \ddot{o} \ldots \ddot{o} E_n)$$

where $\pi_C$ projects the result onto the desired columns C and each term $E_i$ is of the Form $$E_i = \sigma_{p_i}(T_{i_1} \times T_{i_2} \times \ldots \times T_{i_m}).$$

$T_{i_1}, T_{i_2}, \ldots T_{i_m}$ is a subset of the tables in U. Predicate $p_i$ is the conjunction of a subset of the selection and join predicates found in the original form of the query.

The following transformation rules are used for converting SPOJ expression to join-disjunctive form.

$T_1 \bowtie^{lo}_p T_2 = (T_1 \bowtie_p T_2) \ddot{o} T_1$; if $T_1 = T_1 \hat{j}$ and $T_2 = T_2 \hat{j}$    Rule (1)

$T_1 \bowtie^{fo}_p T_2 = (T_1 \bowtie_p T_2) \ddot{o} T_1 \ddot{o} T_2$; if $T_1 = T_1 \hat{j}$ and $T_2 = T_2 \hat{j}$    Rule (2)

$(T_1 \ddot{o} T_2) \bowtie_p T_3 = T_1 \bowtie_p T_3 \ddot{o} T_2 \bowtie_p T_3$; if $T_3 = T_3 \hat{j}$    Rule (3)

$\sigma_{p(1)}(T_1 \bowtie_p T_2 \ddot{o} T_2) = (\sigma_{p(1)} T_1) \bowtie_p T_2$; if $p(1)$ is strong and references only $T_1$    Rule (4)

$\sigma_{p(1)}(T_1 \bowtie_p T_2 \ddot{o} T_1) = (\sigma_{p(1)} T_1) \bowtie_p T_2 \ddot{o}(\sigma_{p(1)} T_1)$; if $p(1)$ references only $T_1$    Rule (5)

Rule (4) follows from the observation that all tuples originating from the term $T_2$ in $(T_1 \bowtie_p T_2 \ddot{o} T_2)$ will be null-extended on all columns of $T_1$. All those tuples will be discarded if p(1) is strong on $T_1$. Rule (5) follows from the rule $\sigma_{p(1)}(T_1 \bowtie_p T_2) = (\sigma_{p(1)} T_1) \bowtie_p T_2$ by expanding the two outer joins.

The following example illustrates conversion of an SPOJ expression using the above rules. p(i,j) denotes a predicate that references columns in tables $T_i$ and $T_j$.

$$\sigma_{p(1)}(T_1 \bowtie^{lo}_{p(1,2)} T_2)) \bowtie^{fo}_{p(2,3)} T_3 = (\sigma_{p(1)}(T_1 \bowtie_{p(1,2)} T_2 \ddot{o} T_2)) \bowtie^{fo}_{p(2,3)} T_3 \quad \text{by Rule (1)}$$

$$= ((\sigma_{p(1)} T_1) \bowtie_{p(1,2)} T_2)) \bowtie^{fo}_{p(2,3)} T_3 \quad \text{by Rule (4)}$$

$$= (T_1 \bowtie_{p(1)' p(1,2)} T_2) \bowtie^{fo}_{p(2,3)} T_3$$

by including selection predicate in join $$= (T_1 \bowtie_{p(1)' p(1,2)} T_2 \bowtie_{p(2,3)} T_3) \ddot{o} \quad \text{by Rule (2)}$$

$$(T_1 \bowtie_{p(1)' p(1,2)} T_2) \ddot{o} T_3$$

Each term in the join-disjunctive form of a SPOJ expression produces tuples with a unique null-extension pattern. Suppose the complete set of operand tables for the expression is U. A term in the join-disjunctive form is defined over a subset S of U and hence, produces tuples that are null extended on U-S. The tables in subset S are called the term's source tables.

A tuple produced by a term with source table set S can only be subsumed by tuples produced by terms whose source table set is a superset of S. The subsumption relationships among terms can be modeled by a DAG (directed acyclic graph), which is referred to as a subsumption graph of the SPOJ expression.

Definition. Let $E = \pi_C(E_1 \ddot{o} \ldots \ddot{o} E_n)$ be the join-disjunctive form of a SPOJ expression. The subsumption graph of E contains a node $n_i$ for each term $E_i$ in the normal form, and the node is labeled with the source table set $S_i$ of $E_i$. There is an edge from node $n_i$ to node $n_j$, if $S_i$ is a minimal superset of $S_j$. $S_i$ is a minimal superset of $S_j$ if there does not exist a node $n_k$ in the graph such that $S_j \mathrel{R} S_k \mathrel{R} S_i$.

Consider the following example that shows two SPOJ views, $V_1$ and $V_2$, their normal forms. FIG. 3 illustrates subsumption graphs for the example SPOJ views $V_1$ and $V_2$.

$$V_1 = C \bowtie^{lo}_{p(c,o)} (O \bowtie^{fo}_{p(c,o)} L)$$
$$= \sigma_{p(c,o) \wedge p(o,l)}(C \times O \times L) \oplus \sigma_{p(c,o)}(C \times O) \oplus (C)$$
$$V_2 = C \bowtie^{fo}_{p(c,o)} (O \bowtie^{fo}_{p(o,l)} L)$$
$$= \sigma_{p(c,o) \wedge p(o,l)}(C \times O \times L) \oplus \sigma_{p(c,o)}(C \times O) \oplus$$
$$\sigma_{p(o,l)}(O \times L) \oplus C \oplus O \oplus L$$

The minimum-union operators in the join-disjunctive normal form have two functions: to eliminate subsumed tuples and to take the union of the remaining tuples. By first eliminating subsumed tuples from every term, the minimum unions can be replaced by outer unions. The resulting form is useful because it clearly shows what terms are affected by an update and how.

Subsumption among terms is not arbitrary; when checking whether a tuple of a term is subsumed, it is sufficient to check against tuples in parent terms. The following lemma shows how to eliminate subsumed tuples from a term.

Lemma. Let $E_i$ be a term in the join-disjunctive normal form E of an SPOJ expression. Then the set of tuples generated by $E_i$ that are not subsumed by any other tuples in E can be computed as, $$D_i = E_i \bowtie^{la}_q (E_{i_1} \uplus E_{i_2} \uplus \ldots \uplus E_{i_m})$$

where $E_{i_1}, E_{i_2}, \ldots E_{i_m}$ are the parent terms of $E_i$ and the join predicate q is an equijoin over columns forming a key of $E_i$.

$D_i$ is called the net contribution of term $E_i$ because the tuples of $D_i$ are not subsumed by any other tuples, and thus, appear explicitly in the view result. Examples of the net contribution form are provided infra.

Theorem. Let E be an SPOJ expression with normal form $\pi_C(E_1 \ddot{o} E_2 \ddot{o} \ldots \ddot{o} E_n)$. Then $$E_1 \ddot{o} E_2 \ddot{o} \ldots \ddot{o} E_n = D_1 \overline{\cup} D_2 \overline{\cup} \ldots \overline{\cup} D_n$$

where each $D_i$ is computed from $E_i$ as defined in this Lemma.

The form $D_1 \cup \ldots \cup D_n$ is called the net-contribution (normal) form of the expression. This form is important because there is no interaction among net contributions from different terms, which means that each term can be maintained independently from other terms.

Figure 4:
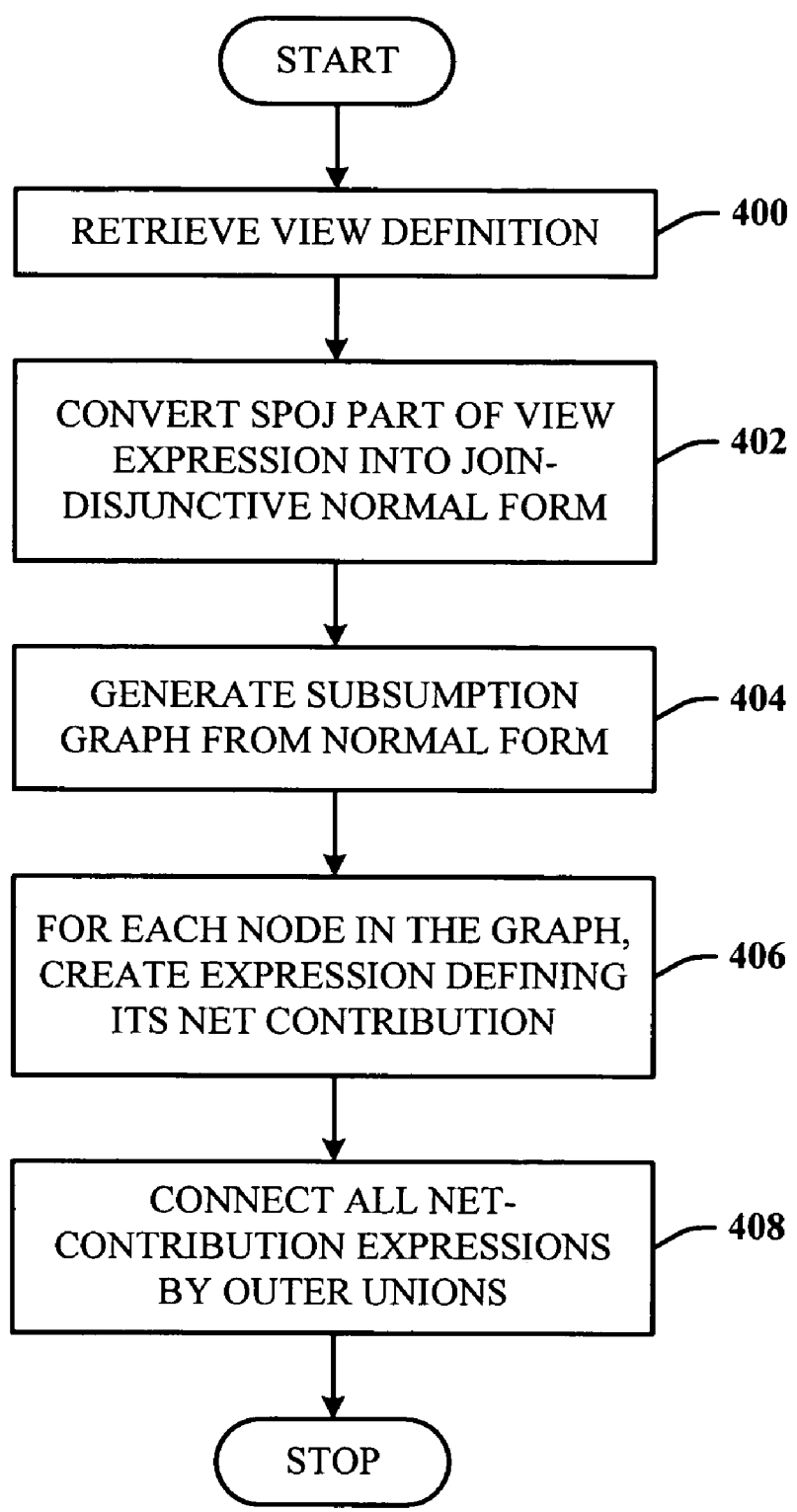
FIG. 4 illustrates a methodology of generating a subsumption graph and net contributions to the view.

Referring now to FIG. 4, there is illustrated a methodology of generating a subsumption graph and net contributions of terms to the view. At 400, the view definition is retrieved. At 402, the SPOJ part of the view expression is converted into join-disjunctive normal form consisting of the minimum union of terms composed of inner joins. At 404, a subsumption graph is created from the normal form, which reveals the subsumption (parent-child) relationships among the terms. At 406, the term expressions in the normal form and the subsumption graph are used to create expressions defining the net contribution of each term to the view. The net contribution expression for a term is constructed according to the Lemma above. At 408, the expression defining the total net contribution is constructed by connecting all net-contribution expressions by outer union operators.

Following is a description of how to incrementally maintain an SPOJ view when a single base table is modified. Only insertions or deletions are addresses here; an update can be treated as a deletion followed by an insertion. The focus here is on deriving correct maintenance expressions and not necessarily the most efficient ones. More efficient expressions are derived infra.

A first task is to identify which terms may be affected by an insertion or a deletion. Consider a view V and suppose one of its base tables T is modified. This may change the net contribution of a term but only if T occurs in the expression defining $D_i$. By inspection of the form of the expression for $D_i$, it is apparent that the change may affect the result in one of three ways:

1. Directly, which occurs if T is among the tables in $T_i$;
2. Indirectly, which occurs if T is not among the tables in $T_i$ but it is among the source tables of one or more of its parent nodes (terms); and
3. No effect, otherwise.

Based on this classification of how terms are affected, a view maintenance graph can be created, as follows.

1. Eliminate from the subsumption graph all nodes (terms) that are unaffected by the update of T.
2. Mark the nodes of the reduced graph by D or I depending on whether the node (term) is affected directly or indirectly.
3. Drop all outgoing edges from nodes marked with I.

FIG. 5 shows three maintenance graphs for view $V_1$ that are derived from the subsumption graph for $V_1$ of FIG. 3. C is a member of the source set of all three nodes so the maintenance graph (a) for updates to C retains all three nodes and they are marked with superscript D. The maintenance graph (b) for updates to O also retains all three nodes. O is a member of the source sets of nodes {C, O, L} and {C, O}; they are affected directly and marked with superscripted D. O is not a member of the source set of node {C} but it is a member of the source set of its parent; this node is affected indirectly and marked with I. The maintenance graph (c) for updates to L retains only nodes {C,O,L} and {C,O}. Node {C} is dropped because neither it nor its parent reference table L.

Figure 6:
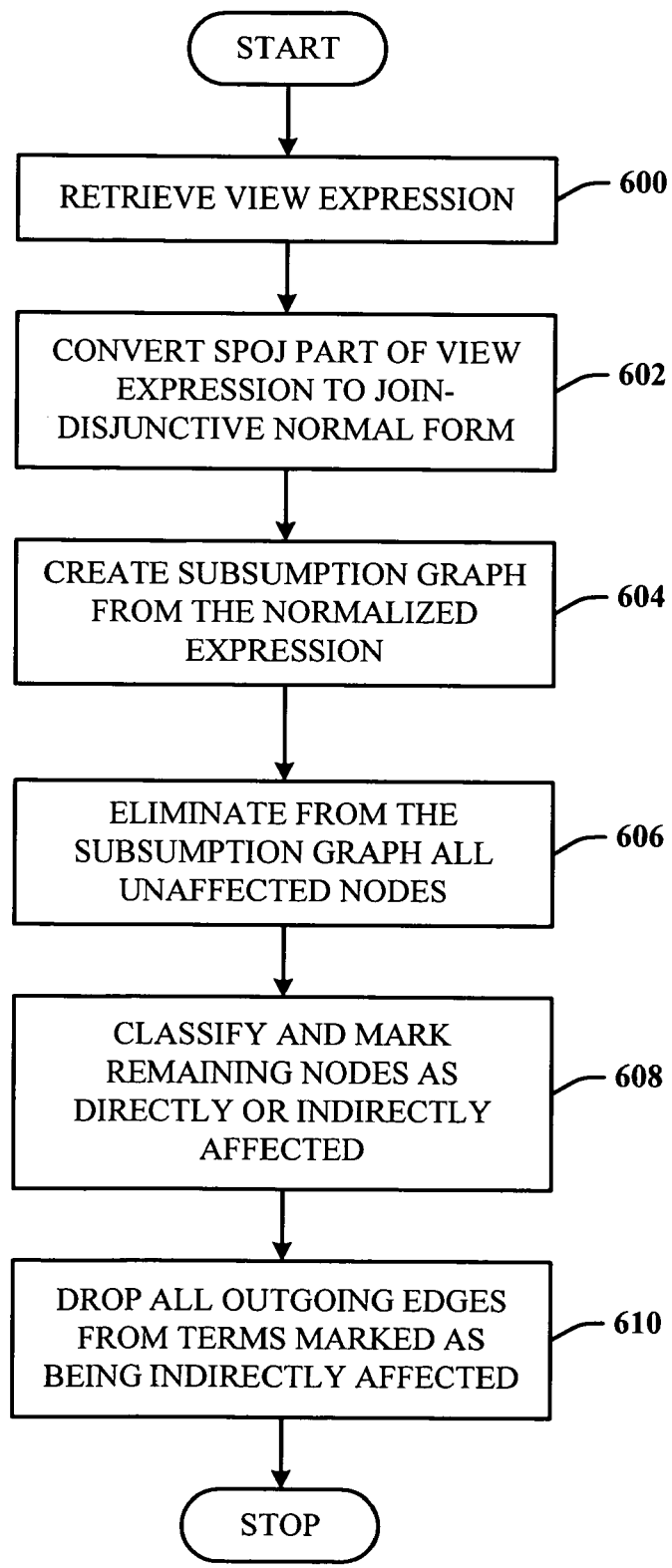
FIG. 6 illustrates a methodology of constructing a maintenance graph for identifying terms affected by an update, in accordance with the disclosed innovation.

Referring now to FIG. 6, there is illustrated a methodology of constructing a maintenance graph identifying terms affected by an update, in accordance with the disclosed innovation. At 600, the expression defining the view is retrieved. At 602, the SPOJ part of the view expression is converted into join-disjunctive normal form. At 604, the subsumption graph is constructed in the manner described earlier. At 606, terms unaffected by the update are eliminated from the subsumption graph. At 608, each remaining node is classified and marked according to whether it represents a directly-affected term or an indirectly-affected term. At 610, all outgoing edges are dropped from terms marked indirectly affected.

Following is a description of view maintenance. $\Delta^1 V$ is used to denote the (outer) union of all changes to directly affected terms, and $\Delta^2 V$ to denote the same for indirectly affected terms. Similarly, $\Delta^1 D_i$ and $\Delta^2 D_i$ denote the change in the net contribution $D_i$ of a directly or an indirectly affected term, respectively. View maintenance can be performed in the following three steps.

1. The affected base table is updated first.
2. If there are no directly affected terms, we are done; otherwise, compute and apply $\Delta^1$ to the view.
3. If there are no indirectly affected terms, we are done; otherwise, compute and apply $\Delta^2$ to the view.

Figure 7:
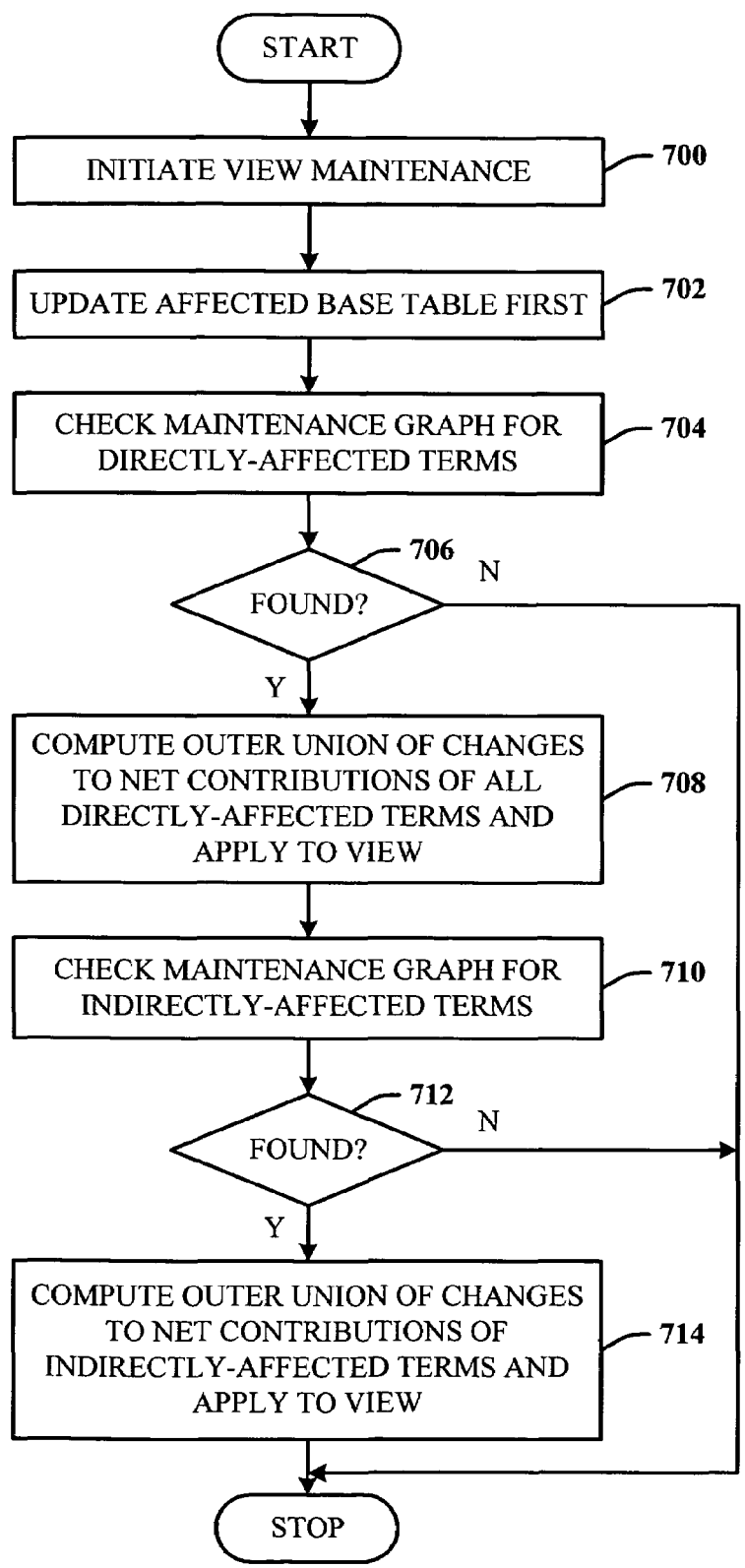
FIG. 7 illustrates a methodology of performing view maintenance in accordance with an innovative aspect.

Accordingly, FIG. 7 illustrates a methodology of performing view maintenance in accordance with an innovative aspect. At 700, view maintenance is initiated. At 702, the affected based table is updated first. As a side effect of this operation, the set of inserted tuples or the set of deleted tuples is obtained. At 704, the maintenance graph is checked for directly-affected terms. If no such terms are found, at 706, the process terminates. If such terms are found, at 706, flow is to 708, where the outer union of changes to the net contributions of directly-affected terms is computed, and these are applied to the view. At 710, the maintenance graph is checked for indirectly-affected terms. Again, at 712, no such terms are found, the process terminates. If such terms are found, at 712, flow progresses to 714, where the outer union of changes to the net contributions of indirectly-affected terms is computed, and these are applied to the view.

Following are derivations of maintenance expressions for insertions and for deletions. First, construct view maintenance expressions for a view V in the case of insertions. The set of new rows inserted into a table T is denoted by $\Delta T$. If $E_i$ ($D_i$) is an expression, the expression obtained from $E_i$ ($D_i$) by replacing every occurrence of T by $\Delta T$ is denoted by $E_i^{\Delta T}$ ($D_i^{\Delta T}$).

Consider the following example. A set of tuples $\Delta O$ has been inserted into table O and it is desired to maintain view $V_1$. FIG. 5(b) shows the maintenance graph for this case. Two nodes are directly affected, namely {C,O,L} and {C, O}. The new tuples to be inserted into the view can be computed by substituting O with $\Delta O$ in the expression for the net contribution of each term. This gives the following $\Delta^1$-expressions, $$\Delta^1 D_{COL} = D_{COL}{}^{\Delta O} = \sigma_{p(c,o)} \wedge_{p(o,l)} (C \times \Delta O \times L),$$

$$\Delta^1 D_{CO} = C_{CO}{}^{\Delta O} = \sigma_{p(c,o)} (C \times \Delta O) \bowtie_q^{la} \sigma_{p(c,o)} \wedge_{p(o,l)} (C \times \Delta O \times L)$$

Predicate q of the anti-semijoin equals (l.ok=r.ok) where l.ok (r.ok) designates the column ok from the left (right) operand of the join.

Next, consider the indirectly affected term {C}. A new O tuple may join with some C tuple that previous did not join with anything. The term may currently contain such orphaned C tuples, which must now be deleted. The view tuples to be deleted can be computed as, $$\Delta^2 Dc = Dc \bowtie_q^{ls} E_{CO}^{\Delta O}$$
$$= (C \bowtie_q^{la} E_{CO}) \bowtie_p^{ls} E_{CO}^{\Delta O}$$
$$= (C \bowtie_q^{la} \sigma_{p(c,o)}(C \times O)) \bowtie_q^{ls} \sigma_{p(c,o)}(C \times \Delta O)$$

where the join predicate q equals (l.ck=r.ck).

Combining the pieces, the following complete maintenance expression can be obtained.

$$V_1(C, O+\Delta O, L) = V_1(C,O,L) \uplus \Delta^1 D_{COL} \uplus \Delta^1 D_{co}$$
$$\uplus \Delta^2 D_C$$

Lemma. Consider a term in the normal form of a SPOJ view whose net contribution is defined by $D_i = E_i \bowtie_q^{la} (E_{i_1} \overline{\cup} \ldots \overline{\cup} E_{i_m})$. Suppose table T has been updated by inserting $\Delta T$ tuples. If the term is directly affected by the insertion, the tuples added to the net contribution of the term can be computed as, $$\Delta^1 D_i = D_i^{\Delta T} = E_i^{\Delta T} \bowtie_q^{la} (E_{i_1}^{\Delta T} \uplus \ldots \uplus E_{i_m}^{\Delta T}).$$

If the term is indirectly affected, the tuples deleted from the net contribution of the term can be computed as, $$\Delta^2 D_i = D_i \bowtie_q^{ls} (E_{i_1}^{\Delta T} \uplus \ldots \uplus E_{i_m}^{\Delta T})$$

where q is an equijoin predicate over a unique key of $E_i$.

The previous example considered view $V_1$ and insertions into O; now consider deletions from O. As in the previous case, two terms are directly affected, namely {C,O,L} and {C,O}, see FIG. 5(b). The $\Delta^1$-expressions for the directly-affected terms are the same as for insertion but now the resulting tuples are deleted from the view. There is one indirectly-affected term {C}. A deleted O tuple may be the last tuple to join with a C tuple. If so, it should appear in the result of the {C} term after the update. The tuples to be inserted can be computed as, $$\Delta^2 Dc = (C \bowtie_q^{ls} \sigma_{p(c,o)}(C \times \Delta O)) \bowtie_q^{la} \sigma_{p(c,o)}(C \times (O - \Delta O))$$
$$= (C \bowtie_q^{la} \sigma_{p(c,o)}(C \times (O - \Delta O))) \bowtie_q^{ls} \sigma_{p(c,o)}(C \times \Delta O)$$

where the join predicate q equals (l.ck=r.ck).

Combining this with the $\Delta^1$-expressions derived earlier, the following complete maintenance expression can be obtained.

$$V_1(C, O-\Delta O, L) = V_1(C, O, L) \uplus (\Delta^1 D_{COL} \uplus \Delta^1 D_{CO})$$
$$\uplus \Delta^2 D_C$$

Lemma. Consider a term in the normal form of a SPOJ view whose net contribution is defined by $D_i = E_i \bowtie_q^{la} (E_{i_1} \uplus \ldots \overline{\cup} E_{i_m})$. Suppose table T has been updated by deleting $\Delta T$ tuples. If the term is directly affected by the deletion, the tuples deleted from the net contribution of the term can be computed as, $$\Delta^1 D_i = D_i^{\Delta T} = E_i^{\Delta T} \bowtie_q^{la} (E_{i_1}^{\Delta T} \uplus \ldots \uplus E_{i_m}^{\Delta T}).$$

If the term is indirectly affected, the tuples added to the net contribution of the term can be computed as, $$\Delta^2 D_i = D_i^{T-\Delta T} \bowtie_q^{ls} (E_{i_1}^{\Delta T} \uplus \ldots \uplus E_{i_m}^{\Delta T}).$$

where q is an equijoin predicate over a unique key of $E_i$.

FIG. 8 illustrates $V_2$ maintenance graphs for updates to table C and for updates to table O. For purposes of brevity, only maintenance expressions for updates to O are derived.

Following are the inner-join terms in the normal form and their corresponding net-contribution terms for view $V_2$.

$$E_{COL} = \sigma_{p(c,o)} \wedge_{p(o,l)} (C \times O \times L), E_{co} = \sigma_{p(c,o)}(C \times O),$$

$$E_{OL} = \sigma_{p(o,l)}(O \times L), E_C = C,$$

$$E_O = O, E_L = L$$

$$D_{COL} = E_{COL}, D_{CO} = E_{CO} \bowtie_{q(c,o)}^{la} E_{COL},$$

$$D_{OL} = E_{OL} \bowtie_{q(o,l)}^{la} E_{COL}, D_C = E_C \bowtie_{q(c)}^{la} E_{CO},$$

$$D_O = E_O \bowtie_{q(o)}^{la} (E_{CO} \uplus E_{LO}), D_L = E_L \bowtie_{q(l)}^{la} E_{LO}$$

The equijoin predicates in the expressions are listed below. The notation l.ck stands for the ck field in the left operand and r.ck stands for the ck field in the right operand. The join columns all represent keys of the tables involved.

$q(c,o) \equiv (l.ck=r.ck \wedge l.ok=r.ok)$ $q(o,l) \equiv (l.ok=r.ok \wedge l.lok=r.ok \wedge l.ln=r.ln)$ $q(c) \equiv (l.ck=r.ck)$ $q(o) \equiv (l.ok=r.ok)$ $q(l) \equiv (l.lok=r.lok \wedge l.ln=r.ln)$ First consider insertions into O. The maintenance graph (FIG. 8(b)) shows four directly affected terms: {C, O, L}, {C, O}, {O,L} and {O}. $\Delta^1 V_2$ can be computed as, $$\Delta^1 V_2 = \Delta^1 D_{COL} \uplus \Delta^1 D_{CO} \uplus \Delta^1 D_{OL} \uplus \Delta^1 Dc$$
$$= E_{COL}^{\Delta O} \uplus E_{CO}^{\Delta O} \bowtie_{q(c,o)}^{la} E_{COL}^{\Delta O} \uplus$$
$$E_{OL}^{\Delta O} \bowtie_{q(o,l)}^{la} E_{COL}^{\Delta O} \uplus E_O^{\Delta O} \bowtie_{q(o)}^{la} (E_{CO}^{\Delta O} \uplus E_{OL}^{\Delta O})$$

Two terms, {C} and {L}, are indirectly affected. The set of tuples to be deleted can be computed as, $$\Delta^2 V_2 = \Delta^2 D_C \uplus \Delta^2 D_L$$
$$= D_C \bowtie_{q(c)}^{ls} E_{CO}^{\Delta O} \uplus D_L \bowtie_{q(l)}^{ls} E_{OL}^{\Delta O}$$
$$= E_C \bowtie_{q(c)}^{la} E_{CO} \bowtie_{q(c)}^{ls} E_{CO}^{\Delta O} \uplus E_L \bowtie_{q(l)}^{la} E_{OL} \bowtie_{q(l)}^{ls} E_{OL}^{\Delta O}$$

For deletions from O, the expressions for $\Delta^1 V_2$ are the same as for insertions, but the $\Delta^2 V_2$ expressions are different.

$$\Delta^2 V_2 = \Delta^2 D_C \uplus \Delta^2 D_L$$
$$= D_C^{O-\Delta O} \bowtie_{q(c)}^{ls} E_{CO}^{\Delta O} \uplus D_L^{O-\Delta O} \bowtie_{q(l)}^{ls} E_{OL}^{\Delta O}$$
$$= E_C \bowtie_{q(c)}^{la} E_{CO}^{O-\Delta O} \bowtie_{q(c)}^{ls} E_{CO}^{\Delta O} \uplus E_L \bowtie_{q(l)}^{la} E_{OL}^{O-\Delta O} \bowtie_{q(l)}^{ls} E_{OL}^{\Delta O}$$

More efficient maintenance expressions can be derived by simplifying the maintenance graph. Following is a description of how to exploit foreign key constraints to eliminate additional nodes from maintenance graphs, thereby simplifying maintenance further.

Consider view $V_1$ and suppose one or more C tuples are inserted. The maintenance graph in FIG. 5(a) shows three directly-affected terms {C,O,L}, {C,O} and {C}. If the join predicate is $p(o, c) \equiv (O.ock=C.ck)$, this is overly pessimistic because of the foreign key constraint from O.ock to C.ck.

A new C tuple inserted into table C cannot join with any existing O tuples, because the joining O tuples would violate the foreign-key constraint. Hence, the insertion cannot affect terms {C,O,L} and {C,O}. This leaves {C} as the only affected term and the view can be updated simply by inserting the new C tuples into the view.

The same reasoning can be applied to deletion. A C tuple that has been deleted from table C cannot join with any tuples in O because, after the deletion, those tuples would remain in O and violate the foreign key constraint. The view can be updated simply by removing the deleted C tuples from the view.

Theorem. Consider a directly affected term with base $S_i$ in the normal form of a SPOJ view and assume that a table $T \epsilon S_i$ is updated by an insertion or deletion. The net contribution of the term is unaffected by the update if $S_i$ contains another table R with a foreign key referencing a non-null, unique key of T and R and T are joined on this foreign key.

This theorem is exploited to eliminate one or more directly-affected nodes and their edges from the maintenance graph. Elimination of some directly-affected nodes may leave an indirectly affected node without incoming edges, that is, without affected parents. Any such nodes can also be eliminated. The resulting graph is called a reduced maintenance graph.

Figure 9:
FIG. 9 illustrates the reduced $V_2$ maintenance graphs of FIG. 8 by exploiting the foreign key constraints between L and O, and between O and C.

This optimization can reduce the maintenance overhead very significantly. Assume that the join predicates of $V_2$ are all equijoins over foreign keys, that is, p(c,o) $\mathbf{L}$(ck=ock) and p(o,l)$\mathbf{L}$(ok=lok). If so, the foreign key constraints between L and O and between O and C can be exploited to reduce the $V_2$ maintenance graphs of FIG. 8 to the graphs shown in FIG. 9. Because of the foreign key constraint from O to C, an insertion into C will not affect nodes {C, O}, and {C, O, L}. Eliminating these two nodes from the maintenance graph leaves nodes {O}, and {O,L} without parents, so they are eliminated too. As shown in FIG. 9(a), this leaves {C} as the only affected node and maintenance is reduced to $\Delta^1 V_2 = \Delta C$ and $\Delta^2 V_2 = \emptyset$.

Because of the foreign key constraint from L to O, an insertion into O will not affect nodes {O,L}, and {C,O,L}. Eliminating these two nodes, leaves node {L} without a parent so it is also eliminated (an indirectly affected node must have a parent). This leaves the reduced graph shown in FIG. 9(b). The maintenance expressions for insertions in O are reduced to, $$\Delta^1 V_2 = \Delta^1 D_{CO} \uplus \Delta^1 D_O$$
$$= E_{CO}^{\Delta O} \uplus E_O^{\Delta O} \bowtie_{q(o)}^{la} E_{CO}^{\Delta O}$$
$$\Delta^2 V_2 = \Delta^2 D_C$$
$$= D_C^{O-\Delta O} \bowtie_{q(c)}^{ls} E_{CO}^{\Delta O}$$
$$= E_C \bowtie_{q(c)}^{la} E_{CO}^{O-\Delta O} \bowtie_{q(c)}^{ls} E_{CO}^{\Delta O}$$

This optimization cannot always be applied. It cannot be applied when an update statement is logically decomposed into a delete and an insert for the purpose of deriving maintenance expressions because, in that case, tuples in T may be only modified and there are no actual deletions and insertions. Neither can it be applied to deletions if the foreign-key constraint is declared with cascading deletes.

SQL-99 allows a constraint to be declared "deferrable", which means that checking of the constraint is deferred to the end of the transaction. The constraint may be temporarily violated during the transaction, and in that case, the simplified maintenance may produce an incorrect result. Hence, the optimization cannot be applied if the foreign key constraint is declared deferrable and the insert/delete statement is part of a multi-statement transaction. It can be safely applied, however, if the insert/delete is not part of a multi-statement transaction.

Figure 10:
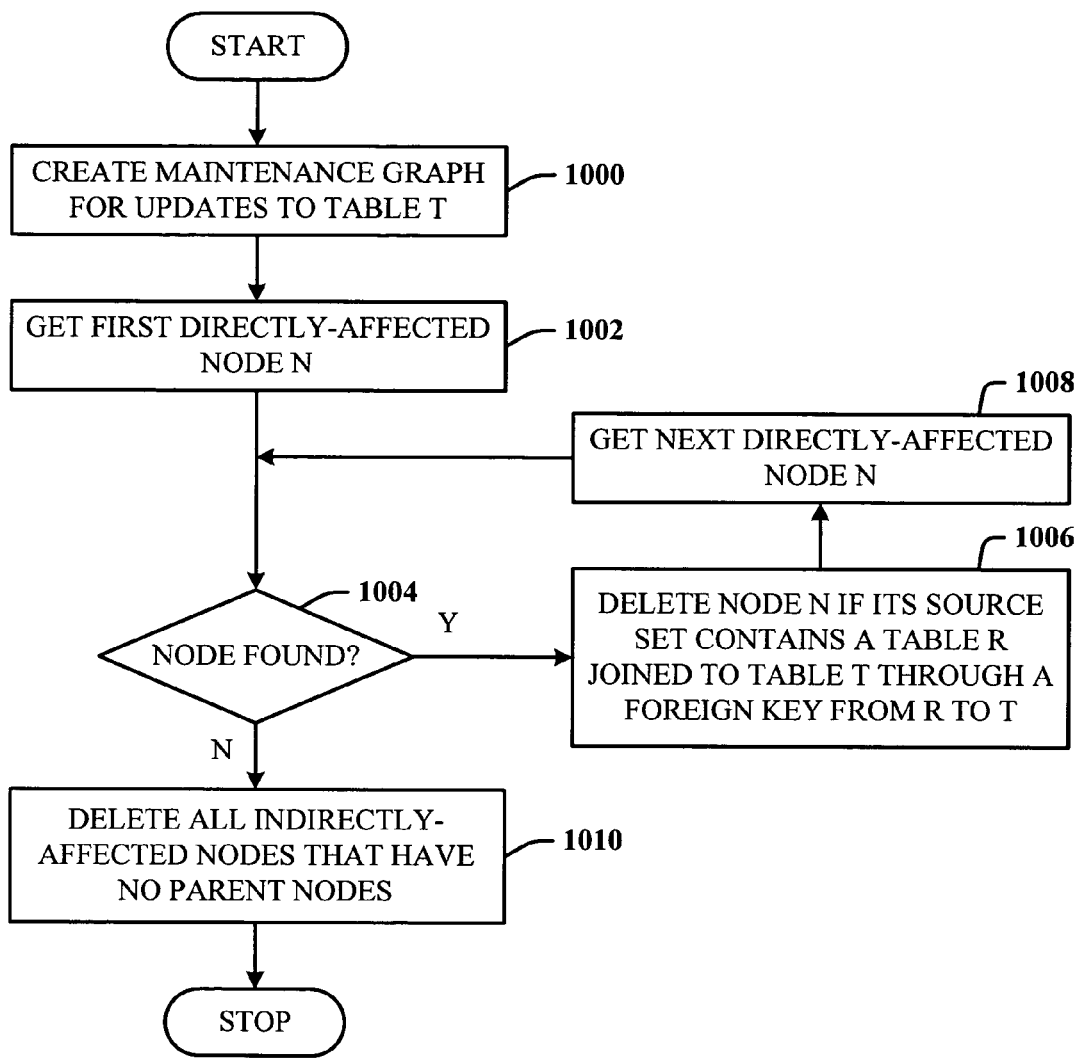
FIG. 10 illustrates a flow diagram of a methodology of creating a reduced maintenance graph by eliminating additional nodes, thereby simplifying maintenance and increasing performance.

FIG. 10 illustrates a flow diagram of a methodology of creating a reduced maintenance graph by eliminating additional nodes, thereby simplifying maintenance and increasing performance. At 1000, the view's initial maintenance graph for updates to table T is created. At 1002, the first directly-affected node of the graph is obtained. At 1004, a check is made as to whether a node was found. If a node was found, flow progresses to 1006 where, the current node is deleted if its source set contains a table R that is joined to table T through an equijoin matching a foreign key from R to T. At 1008, the next directly-affected node is obtained and processing continues at 1004. When all directly-affected nodes have been considered, processing continues at 1010. At 1010, all indirectly-affected nodes that have no parent nodes are deleted. The result is the view's reduced maintenance graph for updates to table T.

The basic expressions for $\Delta^1 V$ are not as efficient as they could be, so a much more efficient way to compute $\Delta^1 V$ is now described. This can be accomplished by an expression composed of left outer joins and inner joins that can easily be constructed from the maintenance graph.

Assume that the affected base table has already been updated. However, this assumption is not crucial because the final expressions for computing $\Delta^1$ do not depend on state of the updated table. In the following example, consider a view $V_3$ derived from tables R, S, T, and U as, $$V_3 = (R \bowtie_{p(r,s)}^{lo} S) \bowtie_{p(r,t)}^{lo} (T \bowtie_{p(t,u)} U).$$

The normal form of the view is $$V_3 = \sigma_{p(r,s)} \wedge_{p(r,t)}$$
$$\wedge_{p(t,u)} (R \times S \times T \times U) \oplus \sigma_{p(t,u)} (T \times U) \oplus \sigma_{p(r,s)} \wedge_{p(t,u)}$$
$$(R \times T \times U) \oplus \sigma_{p(r,s)} (R \times S) \oplus R$$

Figure 11:
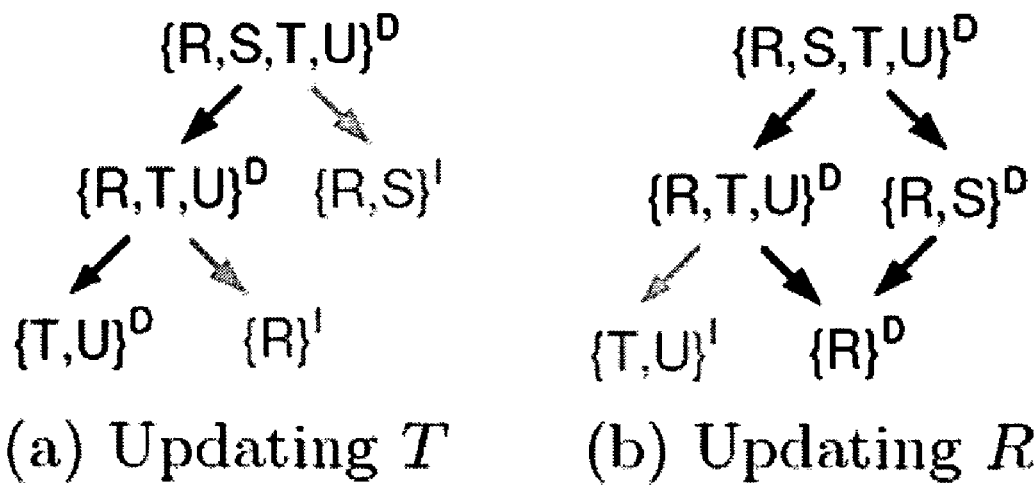
FIG. 11 illustrates maintenance graphs for updates to tables T and R.

FIG. 11 illustrates maintenance graphs for updates to tables T and R. First consider the case of insertions into T. The maintenance graph in FIG. 5(a) indicates that three types of tuples need to be inserted, namely, tuples of the form {T, U}, {R, T, U}, and {R, S, T, U}. The tuples for each term can be computed as $\Delta T \bowtie_{p(t,u)} U$, $(\Delta T \bowtie_{p(t,u)} U) \bowtie_{p(r,t)} R$, and $((\Delta T \bowtie_{p(t,u)} U) \bowtie_{p(r,t)} R) \bowtie_{p(r,s)} S$, respectively. Because T has a unique key, the new tuples cannot be subsumed by tuples already in $V_3$ so it is sufficient to check for subsumption among the new tuples. $\Delta^1 V_3$ can be computed as $$\Delta^1 V_3 = \sigma_{p(t,u)} (\Delta T \times U) \oplus \sigma_{p(r,t)} \wedge_{p(t,u)} (R \times \Delta T \times U) \oplus \sigma_{p(r,s)}$$
$$\wedge_{p(r,t)} \wedge_{p(t,u)} (R \times S \times \Delta T \times U)$$

Every tuple in the first term that is subsumed, is subsumed by a tuple in the second term so we can compute the minimum union of the first two terms by a left outer join $(\Delta T \bowtie_{p(t,u)} U) \bowtie_{p(r,t)}^{lo} R$. The result still contains all tuples of the second term so we can eliminate its subsumed tuples by another left outer join, producing the following expression $$\Delta^1 V_3 = ((\Delta T \bowtie_{p(t,u)} U) \bowtie_{p(r,t)}^{lo}$$

The two expressions can be verified as equivalent by converting the outer-join version into join-disjunctive normal form. Doing so produces exactly the same three terms as above, which proves that they are equivalent.

The maintenance graph for updates to T contained only a single path and the $\Delta^1$-expression was constructed by traversing the path from bottom to top, adding a left outer join for each edge traversed. It is not difficult to see that the same approach applies to any maintenance graph containing a single path. Additionally, if the graph contains multiple paths, the $\Delta^1$-expression can be constructed in the same way using any path.

The maintenance graph for updates to R, shown in FIG. 11(b), contains two paths. In this case, $\Delta^1 V_3$ can be constructed using either path, producing the following two expressions $$(\Delta R \bowtie_{p(r,s)}^{lo} S) \bowtie_{p(r,t)}^{lo} (T \bowtie_{p(t,u)} U)$$

$$(\Delta R \bowtie_{p(r,t)}^{lo} (T \bowtie_{p(t,u)} U)) \bowtie_{p(r,s)}^{lo} S$$

The first version of the expression was obtained from the path {R}, {R, S}, {R, S, T, U}. Node {R} contains the single table R and no predicates so the initial expression is simply $\Delta R$. Compared with node {R}, node {R, S} contains the additional table S and the predicate p(r, s). Traversing the edge and adding a left outer join, produces $(\Delta R \bowtie_{p(r,s)}^{lo} S)$.

Node {R, S, T, U} has two additional tables T and U and predicates p(r,t) and p(t,u). The two tables should first be joined using the local predicate p(t,u) before they are used as the right operand of the left outer join with predicate p(r,t). This produces the first expression.

The second version of the expression was obtained from the path {R}, {R, T, U}, {R, S, T, U}. Using this path, the first edge appends $\bowtie_{p(r,t)}^{lo} (T \bowtie_{p(t,u)} U)$ and the second edge appends $\bowtie_{p(r,s)}^{lo}) S$.

The normal form of $\Delta^1 V_3$ (constructed from the maintenance graph) is $$\Delta^1 V_3 = \Delta R \oplus \sigma_{p(r,s)}(\Delta R \times S) \oplus$$

$$\sigma_{p(r,t) \wedge p(t,u)}(\Delta R \times T \times U) \oplus \sigma_{p(r,s) \wedge p(t,u)}(\Delta R \times S \times T \times U)$$

Converting either of the two outer-join expressions into normal form produces exactly the same terms.

Figure 12:
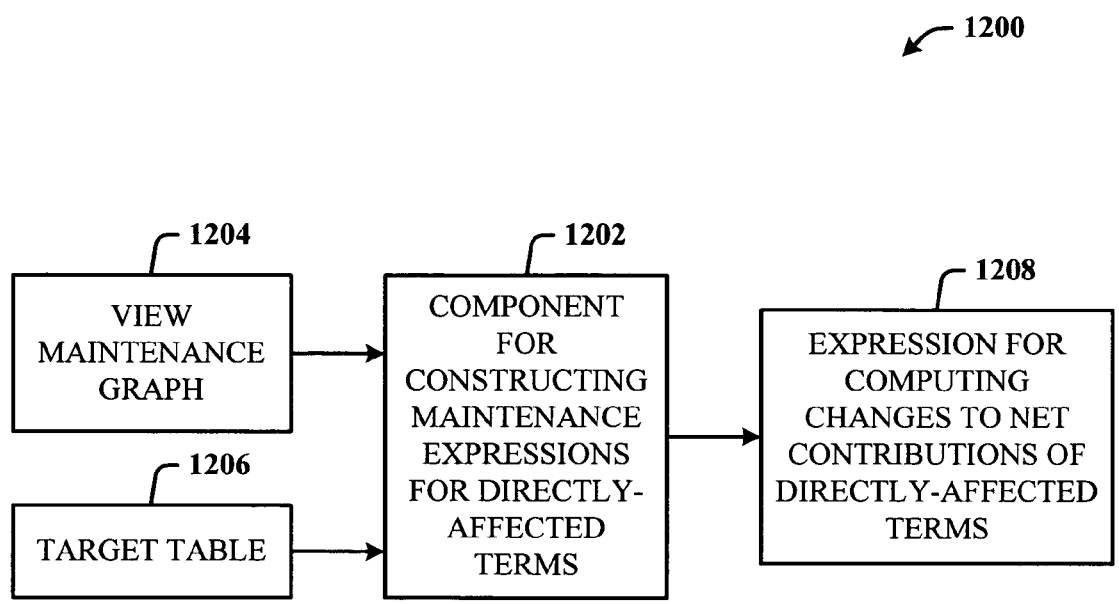
FIG. 12 illustrates a system that constructs an expression for computing the outer union of changes to directly-affected terms.

The following Algorithm 1 is an algorithm for constructing an expression for computing $\Delta^1$ that is comprised of left outer joins and innerjoin. It takes as input a maintenance graph and a target table, and outputs an expression for computing $\Delta^1$. FIG. 12 illustrates a system 1200 that constructs an expression for computing the changes to the net contributions of directly-affected terms. The system 1200 includes an expression construction component 1202 that can execute Algorithm 1. The component 1202 takes as input a view maintenance graph 1204 and a target table 1206. Processing these inputs through the algorithm results in an output expression 1208 that can be employed to compute the changes to the net contributions of directly-affected terms.

Algorithm 1: Make_DeltaOne_Expression(G, T)

Input: MaintenanceGraph G
Input: Table T
Output: RelExpr $\Delta^1$
/*A node in the graph has two fields          */
/*Tbls = set of source tables,                 */
/*Pred = predicate.                            */
Delete every node of G marked with I ;
Node n = the minimal node of G ;
/*Replace T with $\Delta T$                    */
TableSet tb = (n.Tbls − {T}) ∪ $\Delta T$ ;
$\Delta^1$ = '$\sigma_{n.Pred}$' CartProd(tb) ;
while node n has a parent do
   Node p = any parent node of n ;
   /*New tables and predicates             */
   TableSet rb = p.Tbls − n.Tbls ;
   RelExpr rop = CartProd(rb) ;
   Predicate pd = p.Pred − n.Pred ;

-continued

Algorithm 1: Make_DeltaOne_Expression(G, T)

/*More than one new table?                     */
if |rb| > 1 then
   /*Inner-join tables in rb first         */
   Predicate p1 = ∅ ;
   foreach conjunctive term t ∈ pd do
     if t only references tables in rb then
       add t to p1 ;
     end
   end
   rop = '$\sigma_{p1}$' rop ;
   pd = pd − p1 ;
end
$\Delta^1$ = '(' $\Delta^1$ ')' '$\bowtie_{pd}^{lo}$' rop ;
n = p ;
end
return $\Delta^1$ ;

The algorithm uses a function CartProd that takes as input a set of tables $T = \{T_1, T_2, \ldots, T_n\}$ and outputs the expression $(T_1 \times T_2 \times \ldots \times T_n)$. It takes some liberty with the notation for predicates by sometimes treating them as sets of conjuncts. For example, the notation p.Pred−n.Pred means all conjuncts of p.Pred except those also found in n.Pred.

A node n is minimal if there is no other node whose base is a subset of the base of node n. The algorithm assumes that, after indirectly affected nodes have been eliminated, the maintenance graph contains a single minimal node.

The algorithm is safe because it is always possible to validate the expression produced by converting it to normal form, and then verifying that it contains exactly the directly-affected terms contained in the maintenance graph.

A goal is to efficiently compute $\Delta^2$ using $\Delta^1$ and either the view (after applying $\Delta^1$) or base tables. Both options are considered here. When possible, it is usually more efficient to use the view than base tables but the query optimizer should choose the cheaper alternative in a cost-based manner.

Assume that the affected base table has been updated and $\Delta^1$ has been applied to the view. It turns out that whether $\Delta^1$ has been applied or not has no effect on $\Delta^2$. The basic $\Delta^2$ expressions for insertions and for deletions from above are $$\text{Insertion: } \Delta^2 D_i = D_i \bowtie_q^{ls} (E_{i_1}^{\Delta T} \uplus \ldots \uplus E_{i_m}^{\Delta T})$$

$$\text{Deletion: } \Delta^2 D_i = D_i^{T - \Delta T} \bowtie_q^{ls} (E_{i_1}^{\Delta T} \uplus \ldots \uplus E_{i_m}^{\Delta T})$$

Both expressions contain a semijoin and the right operand, called the parent delta, is the same in both cases. It is shown below how to extract the parent delta from $\Delta^1 V$.

The left operands are slightly different for insertions and deletions. In many cases, but not always, the left operand can be extracted from the view itself and it is shown herein when and how this can be done. However, it can always be computed from base tables and the delta of the updated table.

Every term in a view has a unique set of source tables and is null-extended on all other tables in the view. Hereinafter, the source tables of $E_i$ and $D_i$ are denoted by $T_i$ and the set of tables on which $D_i$ is null-extended, by $S_i$.

Tuples from a term with source set T can be recovered from a view or view delta by a selection using the predicate $NN(T) = \wedge_{t \in T} \bar{a} \text{Null}(t)$.

The following describes computation of the parent delta. The expression for $\Delta^2 D_i$ contains a semijoin with the delta of its parents, that is, with $(E_{i_1}^{\Delta T} \uplus \ldots \uplus E_{i_m}^{\Delta T})$. The parents are directly-affected terms so the parent delta is included in $\Delta^1 V$.

The following expression extracts the complete parent delta from $\Delta^1 V$ $$E_{i_1}^{\Delta T} \uplus \ldots \uplus E_{i_m}^{\Delta T} = \delta\sigma_{NN(par\ E_i)}\Delta^1 V$$

where $NN(par\ E_i) = V_{K=1}^m NN(T_{i_k})$ and $T_{i_k}$ denotes the source set of parent term $E_{i_k}$.

Consider a view $V_3$ in the following example, and assume that table T is being modified. The maintenance graph in FIG. 11(a) shows two indirectly-affected terms {R} and {R, S} with parents {R, T, U} and {R, S, T, U}, respectively. The following expressions extract the two required parent deltas from $\Delta^1 V_3$.

$$E_{RTU}^{\Delta T} = \delta\sigma_{NN(RTU)}\Delta^1 V_3$$

$$E_{RSTU}^{\Delta T} = \delta\sigma_{NN(RSTU)}\Delta^1 V_3$$

If table R is modified, the maintenance graph in FIG. 11(b) shows that {T, U} is the only indirectly affected term and its parent is {R, T, U}. Its parent delta can be computed as $$E_{RTU}^{\Delta R} = \delta\sigma_{NN(RTU)}\Delta^1 V_3$$

Next, expressions for computing $\Delta^2 D_i$ from $\Delta^1 V$ and the view (after applying $\Delta^1 V$) are derived. After insertion into table T, the base expression for $\Delta^2 D_i$ is $$\Delta^2 D_i = D_i \bowtie_q^{ls} (E_{i_1}^{\Delta T} \uplus \ldots \uplus E_{i_m}^{\Delta T})$$
$$= D_i \bowtie_q^{ls} \delta\sigma_{NN(par\ E_i)}\Delta^1 V$$

$D_i$ is the net contribution of term i in the old state of the view (before applying the current update). The tuples of $D_i$ can be extracted from the view by the expression $$D_i = \sigma_{Ex(D_i)}V, \text{ where } Ex(D_i) = N(T_{i_k}) \wedge N(S_{i_k}).$$

$T_{i_k}$ denotes the source table set of term $E_{i_k}$ and $S_{i_k}$ denotes the tables on which term $E_{i_k}$ is null extended. Because the net contribution of the term is being extracted, it is necessary to also include conditions on the null-extended tables.

This is similar to extracting the parent delta from $\Delta^1 V$ but with one significant difference: the view may not output a non-null column for every source table. Even so, it may still be possible to extract $D_i$ from the view. The exact conditions when extraction is still possible are derived elsewhere. A key observation is that the view should expose enough non-null columns to uniquely distinguish $D_i$ tuples from tuples of all other terms.

$E_i$ is an indirectly-affected term so applying $\Delta^1 V$ does not affect $E_i$, only its parent terms. Hence, the tuples in the view satisfying predicate $Ex(D_i)$ are exactly the same after applying $\Delta^1 V$ to view. This means that $D_i$ can be computed from either V or $V+\Delta^1 V$, that is, $$D_i = \sigma_{Ex(D_i)}V = \sigma_{Ex(D_i)}(V+\Delta^1 V)$$

Combining the pieces together, the final expressions for computing $\Delta^2 D_i$ are, $$\Delta^2 D_i = \sigma_{Ex(D_i)}(V+\Delta^1 V) \bowtie_q^{ts} \delta\sigma_{NN(par\ E_i)}\Delta^1 V$$
$$= \sigma_{Ex(D_i)}(V+\Delta^1 V) \bowtie_q^{ts} \delta\sigma_{NN(par\ E_i)}\Delta^1 V$$

Intuitively, this expression makes sense. It amounts to the following: after inserting $\Delta^1$, find the tuples in the view that did not previously join and delete those that are now included in a new tuple inserted into a parent term.

Continuing with the previous example, for an insertion in T, compute $\Delta D_R$ and $\Delta D_{RS}$. According to the derivation above, they can be computed as $$D_R = \sigma_{NN(R)} \wedge_{N(STU)} (V_3 + \Delta^1 V_3)$$

$$D_{RS} = \sigma_{NN(RS)} \wedge_{N(TU)} (V_3 + \Delta^1 V_3)$$

Combining them with the corresponding parent deltas from the example obtains the following expressions $$\Delta^2 D_R = D_R \bowtie_{q(key\ R)}^{ls} E_{RTU}^{\Delta T}$$
$$= \sigma_{NN(R) \wedge N(STU)}(V_3 + \Delta^1 V_3) \bowtie_{q(key\ R)}^{ls} \sigma_{NN(RTU)}\Delta^1 V_3$$

$$\Delta^2 D_{RS} = D_{RS} \bowtie_{q(key\ RS)}^{ls} E_{RSTU}^{\Delta T}$$
$$= \sigma_{NN(RS) \wedge N(TU)}(V_3 + \Delta^1 V_3) \bowtie_{q(key\ RS)}^{ls} \sigma_{NN(RSTU)}\Delta^1 V_3$$

where q(key R) denotes an equijoin condition between the key columns of R in the left operand and in the right operand and similarly for q(key RS).

For an insertion into R, we can compute $\Delta D_{TU}$ as $$\Delta^2 D_{TU} = D_{TU} \bowtie_{q(key\ TU)}^{ls} E_{RTU}^{\Delta R}$$
$$= \sigma_{NN(TU) \wedge N(RS)} V_3' \bowtie_{q(key\ TU)}^{ls} \sigma_{NN(RTU)}(V_3 + \Delta^1 V_3)$$

In case of a deletion from table T, the base expression for $\Delta^2 D_i$ is $$\Delta^2 D_i = D_i^{T-\Delta T} \bowtie_q^{ls} (E_{i_1}^{\Delta T} \uplus \ldots \uplus E_{i_m}^{\Delta T})$$
$$= D_i^{T-\Delta T} \bowtie_q^{ls} \sigma_{NN(par\ E_i)}\Delta^1 V$$

Expand $D_i^{T-\Delta T}$ to get a closer look at the expression.

$$D_i^{T-\Delta T} = E_i \bowtie_q^{la} (E_{i_1}^{T-\Delta T} \uplus \ldots \uplus E_{i_m}^{T-\Delta T})$$

$E_{i_k}^{T-\Delta T}$ represents a parent term after the update has been applied while $E_i$ represents the term before applying the current update. However, $E_i$ is an indirectly-affected term so it is not affected by applying $\Delta^1 V$ to the view. Hence, $E_i$ can be extracted from the view either before or after applying $\Delta^1 V$. A parent term of an indirectly affected term is always a directly affected term so the state of $E_{i_k}^{T-\Delta T}$ depends on $\Delta^1 V$ (but not on $\Delta^2 V$).

The first component of $D_i^{T-\Delta T}$ can be computed from the view by $$E_i = \delta\sigma_{NN(T_i)}V = \delta\sigma_{NN(T_i)}(V-\Delta^1 V)$$

The second component can be computed from the view by $$E_{i_1}^{T-\Delta T} \uplus \ldots \uplus E_{i_m}^{T-\Delta T} = \sigma_{NN(par\ E_i)}(V-\Delta^1 V)$$

where $NN(par\ E_i)$ selects the tuples of all parents of term $E_i$.

Now reassemble the expression for $\Delta^2 D_i$ and at the same time change the order of the semijoin and the anti-semijoin, which produces the expression $$\Delta^2 D_i = D_i^{T-\Delta T} \bowtie_q^{ls} \sigma_{NN(par\,E_i)} \Delta^1 V$$
$$= (\delta\sigma_{NN(T_i)} V \bowtie_q^{ls} \sigma_{NN(par\,E_i)} \Delta^1 V) \bowtie_q^{la} \sigma_{NN(par\,E_i)} (V - \Delta^1 V)$$

Recall that $E_i = \delta\sigma_{NN(T_i)} V$. Hence, $\sigma_{NN(par\,E_i)}\Delta^1 V$ contains tuples that exist in the parents of term $E_i$ and are to be deleted, and predicate q is an equijoin predicate on the key of $E_i$. Suppose t is a tuple in $\sigma_{NN(par\,E_i)}\Delta^1 V$. Because t is a tuple from a parent of $E_i$ then the projection of t onto the columns of $E_i$ must exist in $E_i$.

Furthermore, this is the only tuple in $E_i$ that t will join with because the join predicate is on the key of $E_i$. In summary, every tuple in $\sigma_{NN(par\,E_i)}\Delta^1 V$ is guaranteed to join with exactly one tuple in $\sigma_{NN(T_i)} V$. This being the case, it is possible to eliminate the semijoin and compute the result directly from $\sigma_{NN(par\,E_i)}\Delta^1 V$ as follows $$\delta\sigma_{NN(T_i)} V \bowtie_q^{ls} \sigma_{NN(par\,E_i)}\Delta^1 V = \delta\pi_{T_i,*}\sigma_{NN(par\,E_i)}\Delta^1 V.$$

Expressed in words, first extract from $\Delta^1 V$ all tuples from parent terms of $E_i$ ($\sigma_{NN(par\,E_i)}\Delta^1 V$), then project them onto all (available) columns of the source tables of $E_i$ ($\pi_{T_i,*}$) and finally eliminate duplicates ($\delta$).

Applying this simplification, obtain the following final expressions for computing $\Delta^2 D_i$ $$\Delta^2 D_i = (\delta\pi_{T_i,*}\sigma_{NN(par\,E_i)}\Delta^1 V) \bowtie_q^{la} \sigma_{NN(par\,E_i)}(V-\Delta^1 V)$$

This expression also makes sense intuitively. After a deletion, first, project all the (parent) tuples to be deleted onto the tables of the indirectly affected term and eliminate duplicates. This gives the potentially orphaned tuples. Then insert those that are not included in any parent tuple after the deletion, that is, the actual orphans. If the view does not expose non-null columns for all tables, the same considerations as for insertions apply.

Continuing with the example view $V_3$ and assuming deletions from table T, find that $\Delta D_R$ and $\Delta D_{RS}$ can be computed as follows.

$$\Delta^2 D_R = (\delta\pi_{R,*}\sigma_{NN(RTU)}\Delta^1 V_3) \bowtie_{q(key\,R.)}^{la} \sigma_{NN(RTU)}(V_3 - \Delta^1 V_3)$$

$$\Delta^2 D_{RS} = (\delta\pi_{(RS),*}\sigma_{NN(RSTU)}\Delta^1 V_3) \bowtie_{q(key\,RS)}^{la} \sigma_{NN(RSTU)}(V_3 - \Delta^1 V_3)$$

For deletions from table R, the update to the only indirectly-affected term can be computed as $$\Delta^2 D_{TU} = (\delta\pi_{(TU),*}\sigma_{NN(RTU)}\Delta^1 V_3) \bowtie_{p(key\,TU)}^{la} \sigma_{NN(RTU)}(V_3 - \Delta^1 V_3)$$

If the view is aggregated or does not expose sufficient non-null columns, the contribution of a term cannot be extracted from the view. In that case, $\Delta^2$ for the term has to be computed from base tables and the delta of the updated table. How to do so efficiently is now described. Deletions are covered first because deletions turn out to be somewhat easier to handle than insertions.

Assume that the update has already been applied to table T and thus, only the new state of the table is available. The new state of the table is $T+\Delta T$ after an insertion and $T-\Delta T$ after a deletion.

The parent delta $E_{i_1}^{\Delta T} \uplus \ldots \uplus E_{i_m}^{\Delta T}$ can, of course, be extracted from $\Delta^1 V$ so rewrite $\Delta_2 D_i$ as follows $$\Delta^2 D_i = D_i^{T-\Delta T} \bowtie_q^{ls} (E_{i_1}^{\Delta T} \uplus \ldots \uplus E_{i_m}^{\Delta T})$$
$$= D_i^{T-\Delta T} \bowtie_q^{ls} \sigma_{NN(par\,E_i)}\Delta^1 V$$

The expression for $D_i^{T-\Delta T}$ references only base tables but it is very inefficient. A more efficient expression is shown below but for sake of brevity, the complete derivation is not included herein. Include herein is only what is needed to interpret the final expression.

First, expand the expression for $D_i^{T-\Delta T}$ and then apply the transformation rule $R \bowtie_p^{la} (S_1 \uplus S_2) = R \bowtie_p^{la} S_1 \bowtie_p^{la} S_2$ to eliminate the union. This rule is valid for all tables R, $S_1$, $S_2$ and predicates p.

$$D_i^{T-\Delta T} = E_i \bowtie_q^{la} (E_{i_1}^{T-\Delta T} \uplus \ldots \uplus E_{i_m}^{T-\Delta T})$$
$$= E_i \bowtie_q^{la} E_{i_1}^{T-\Delta T} \ldots \bowtie_q^{la} E_{i_m}^{T-\Delta T}$$

A parent term $E_{i_k}$ contains all the tables and predicates of the child term $E_i$ plus it joins in some additional tables. Make this explicit by splitting the parent term into two parts: $E_i$ and a residual. Denote the residual by $E'_{i_k}$, and the join predicate connecting the two parts by $q_k$. A conjunct in the predicate of $E_{i_k}$ is included in $q_k$ if it references columns from a table in $E_i$ and also columns from a table in $E'_{i_k}$.

After applying a rather long sequence of transformations (not shown), obtain the final expression $$\Delta^2 D_i = (\delta\pi_{T_i,*}\sigma_{NN(par\,E_i)}\Delta^1 V) \bowtie_{q_1}^{la} E'_{i_1}^{(T-\Delta T)} \ldots \bowtie_{q_m}^{la} E'_{i_m}^{(T-\Delta T)}$$

Each $E'_{i_k}^{(R-\Delta T)}$ can be computed from base tables and $T-\Delta T$. This is clear when rewriting the expression as $$E'_{i_k}^{(T-\Delta T)} = E''_{i_k} \bowtie_{r_k} (T-\Delta T))$$

where $E''_{i_k}$ is the join of all tables in $E'_{i_k}$ except T, $T-\Delta T$ is the new state of T, and $r_k$ is the predicate joining T to the other tables.

In another example, consider view $V_3$ and how to compute $\Delta^2$ after a deletion from table T. Applying the formula derived above, find that $\Delta^2 D_R$ and $\Delta^2 D_{RS}$ can be computed as $$\Delta^2 D_R = (\delta\pi_{(R),*}\sigma_{NN(RTU)}\Delta^1 V_3) \bowtie_{p(r,t)}^{la} (U \bowtie_{p(t,u)} (T-\Delta T))$$

$$\Delta^2 D_{RS} = (\delta\pi_{(RS),*}\sigma_{NN(RSTU)}\Delta^1 V_3) \bowtie_{p(r,t)}^{la} (U \bowtie_{p(t,u)} (T-\Delta T))$$

Insertions are now considered. Rewrite $\Delta^2 D_i$ for insertions as follows $$\Delta^2 D_i = D_i \bowtie_q^{ls} (E_{i_1}^{\Delta T} \uplus \ldots \uplus E_{i_m}^{\Delta T}) = D_i \bowtie_q^{ls} \sigma_{NN(par\,E_i)}\Delta^1 V$$

Applying the same sequence of transformations as for deletions we obtain the expression $$\Delta^2 D_i = (\delta\pi_{E_i,*}\sigma_{NN(par\,E_i)}\Delta^1 V) \bowtie_{q_1}^{la} E'_{i_1} \ldots \bowtie_{q_m}^{la} E'_{i_m}$$

Each expressions $E'_{i_k}$ includes a join with the old state of T but only the new state $T+\Delta T$ is available. To handle this, use the equality $T=(T+\Delta T)-\Delta T$ and rewrite $E'_{i_k}$ as follows $$E'_{i_k} = E''_{i_k} \bowtie_{r_k} T$$
$$= E''_{i_k} \bowtie_{r_k} ((T + \Delta T) - \Delta T))$$
$$= E''_{i_k} \bowtie_{r_k} ((T + \Delta T) \bowtie_{q(key\ T)}^{la} \Delta T))$$

where the predicate q(key T) denotes an equijoin predicate over the key of T.

Continuing with the example view $V_3$. After an insertion into table T, the tuples to be deleted from the view can be computed as $$\Delta^2 D_R = (\delta \pi_{(R)} \cdot \sigma_{NN(RTU)}) \Delta^1 V_3 \bowtie_{p(r,t)}^{la} (U \bowtie_{p(t,u)}$$
$$((T+\Delta T) \bowtie_{q(key\ T)}^{la} \Delta T))$$

$$\Delta^2 D_{RS} = (\delta \pi_{(RS)} \cdot \sigma_{NN(RSTU)}) \Delta^1 V_3 \bowtie_{p(r,t)}^{la} (U \bowtie_{p(t,u)}$$
$$((T+\Delta T) \bowtie_{q(key\ T)}^{la} \Delta T))$$

Figure 13:
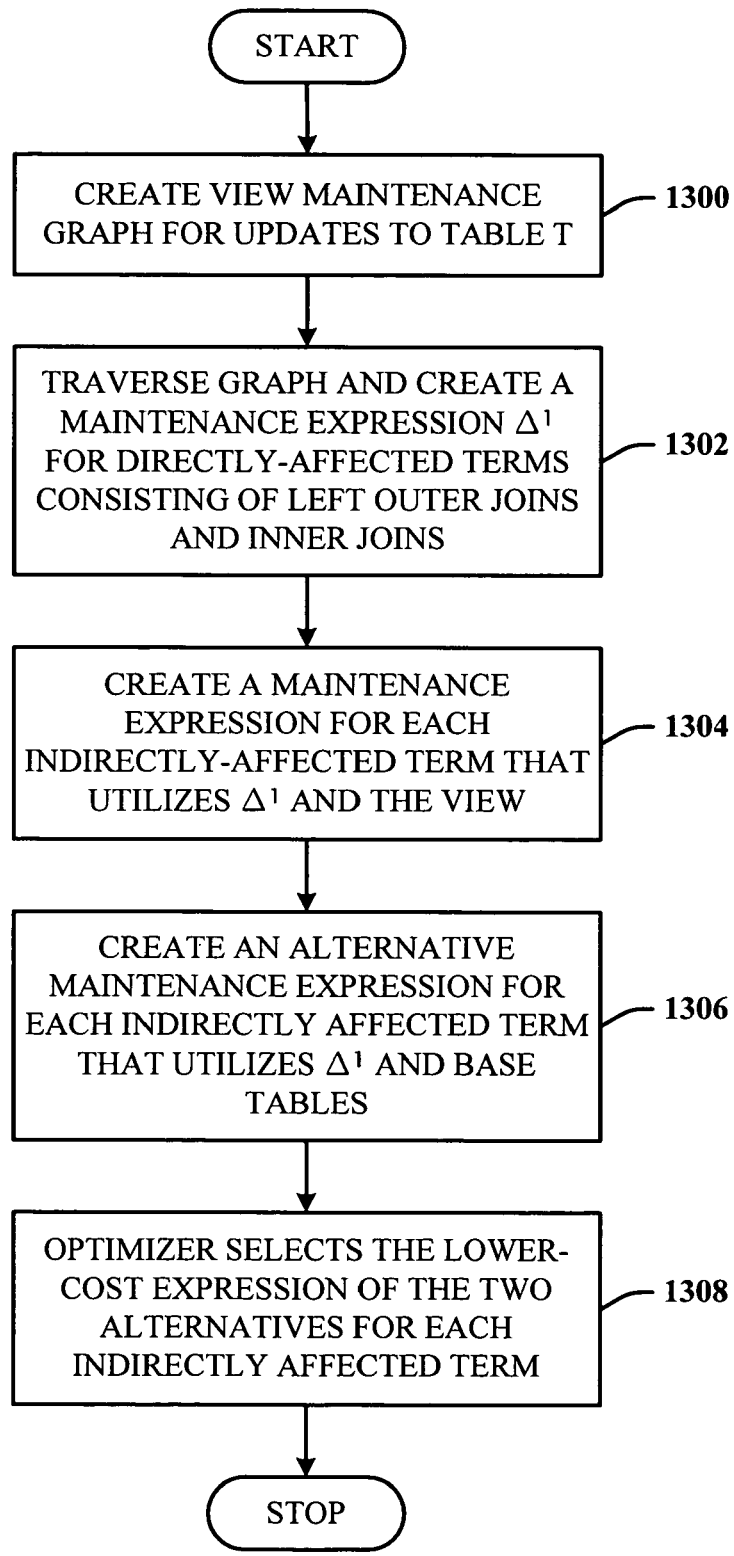
FIG. 13 illustrates a methodology of constructing efficient maintenance expressions for an outer-join view.

FIG. 13 illustrates a methodology of constructing efficient maintenance expressions for an outer-join view. At 1300, the view maintenance graph is constructed. At 1302, the graph is traversed and a maintenance expression $\Delta^1$ for directly-affected terms is constructed consisting out left-outer joins and inner joins. At 1304, a maintenance expression is constructed for each indirectly-affected term that computes the change from $\Delta^1$ and the view. For some terms, it may not be possible to construct a maintenance expression of this type because the view does not output all required columns. At 1306, an alternative maintenance expression is constructed for each indirectly-affected term. The alternative expression computes the change from $\Delta^1$ and base tables. At 1308, the optimizer selects one of the two alternatives for each indirectly-affected term based on their estimated cost.

Following is a description of aggregated views. An aggregated outer-join view is simply an outer-join view with a single group-by on top. Maintaining an aggregated outer-join view can be more expensive than maintaining the corresponding non-aggregated view because the system may have to compute $\Delta^2$ from base tables. However, in many cases it can be inferred that an insertion or deletion cannot affect the number of groups. If so, the maintenance overhead is greatly reduced. Disclosed herein is derivation of a sufficient condition for deciding when an update cannot affect the number of groups.

Aggregation views normally contain a count(') column (row count) because it is needed for incremental maintenance. To facilitate view maintenance, it is recommended that the view can also contain a not-null count for every table that is null-extended in some term. The not-null count of a table T is denoted by nn count(T). In SQL, nncount(T) can be implemented as count(T.c) where c is any column of T that is not nullable.

For simplicity, also assume that all columns involved in an aggregation function cannot contain nulls. Incremental maintenance of aggregates over nullable columns is feasible for outer-join views, but outside the scope of this description. The problem is not specific to outer-join views—it is applies to all types of views, including inner-join views.

SQL requires that all non-aggregated columns of a query be included in the group-by list. In many queries some of the grouping columns are redundant in the sense that eliminating them does not affect the number of groups. It is standard practice in query optimization to minimize the group-by list by eliminating redundant columns. In what follows, assume that all group-by lists have been minimized.

Maintaining an aggregated outer-join view is not much more complex then maintaining a non-aggregated view. $\Delta^1$ for the non-aggregated part of the view is computed in the same way as described supra. The result is then aggregated as specified in the view definition, and applied to the view in the same way as for aggregated inner-join views. New rows are created as needed. Any row whose row count becomes zero is deleted. If a not-null count, say nn_count(T), becomes zero, all aggregates referencing any column in T are set to null. This updates the directly affected terms.

Next, compute $\Delta^2$ for each indirectly affected term in the base view, aggregate the results and apply it to the view. However, $\Delta^2$ may have to be computed from base tables as described supra, because it may not be possible to extract a required term from the aggregated view, the reason being that tuples from different terms that have been combined into the same group can no longer be separated out.

In many cases, an inference can be made that an insertions into or deletions from a table T cannot increase or decrease the number of rows in an aggregated view. If so, view maintenance is simplified to updating existing rows. This significantly reduces maintenance overhead. This is considered an important special case.

By way of example, suppose a view, goj_view, is created as shown below. The view consists of an outer join of the tables Customer and Orders, followed by a group by on c_custkey. For each customer, the view computes the sum of the total price of the customer's orders. If a customer does not have any orders, the sum returns null. The view also contains two counts used for maintenance purposes. Orphaned customers all have count(o_orderkey)=0.

```
create view goj_view as
  select c_custkey, sum(o_totalprice) as tot_price
    count(o_orderkey) as nn_count, count(') as row_count
  from customer left outer join orders
    on (c_custkey=o_custkey)
  group by c_custkey
```

The view contains one group for each customer. Denote the view part, except the final aggregation, as the base view. The normal form of the base view is $\sigma_p(CL'O)$ ö C.

When inserting new order rows, the number of customers remains the same and, consequently, the number of groups in the aggregation view remains the same. The aggregation value, tot_price, can be maintained using $\Delta^1$ in the same way as a regular aggregation view. Some orphaned customers may join with new orders. Such orphaned customers can be easily detected by the fact that nn_count=0 before the update. They are updated simply by replacing values for the sum and the two counts with corresponding values from $\Delta^1$.

Similarly, when deleting records from Orders, first maintain the view (including nn_count) using $\Delta^1$. If nn_count decreases to zero for a customer, this customer no longer has any orders and we simply set tot_price to null.

For this type of update there is no need to recover individual terms. The maintenance can be done very efficiently by examining the not-null counts and updating existing rows. The following theorem states under what conditions the number of groups in an aggregation view is guaranteed to not change as a result of an insertion or a deletion. Denote tables whose columns are in the group-by list as group-by tables, and tables whose columns are aggregated as aggregated tables. Note that a table can serve as both a group-by table and an aggregated table.

Theorem. The number of groups in an aggregation view V does not change as a result of an insertion into or deletion from a table R if the base view satisfies the following three conditions.

1. The subsumption graph contains a single minimal term T that includes all group-by tables.
2. Term T is not directly affected (but may be indirectly affected).
3. All other affected terms are ancestors of T.

Restating the first condition in more precise terms, denote the set of group-by tables by G, and $S_G$ the subset of nodes in the subsumption graph whose source set contains G. The first condition is satisfied if there exists a node T in $S_G$ such that the source set of T is contained in the source set of every other node in $S_G$ and no other node in $S_G$ has this property.

For updates that satisfy the conditions in the theorem, the number of groups in the view does not change and only the corresponding aggregated values should be updated. When the not-null count for a table T becomes zero in a group, it is known that all rows in the group are null-extended on table T. In that case, all aggregation values that depend on table T are set to null. Upon insertion, replace the aggregated value with the new one from the delta-expression if the group has a zero not-null count before the update.

Figure 14:
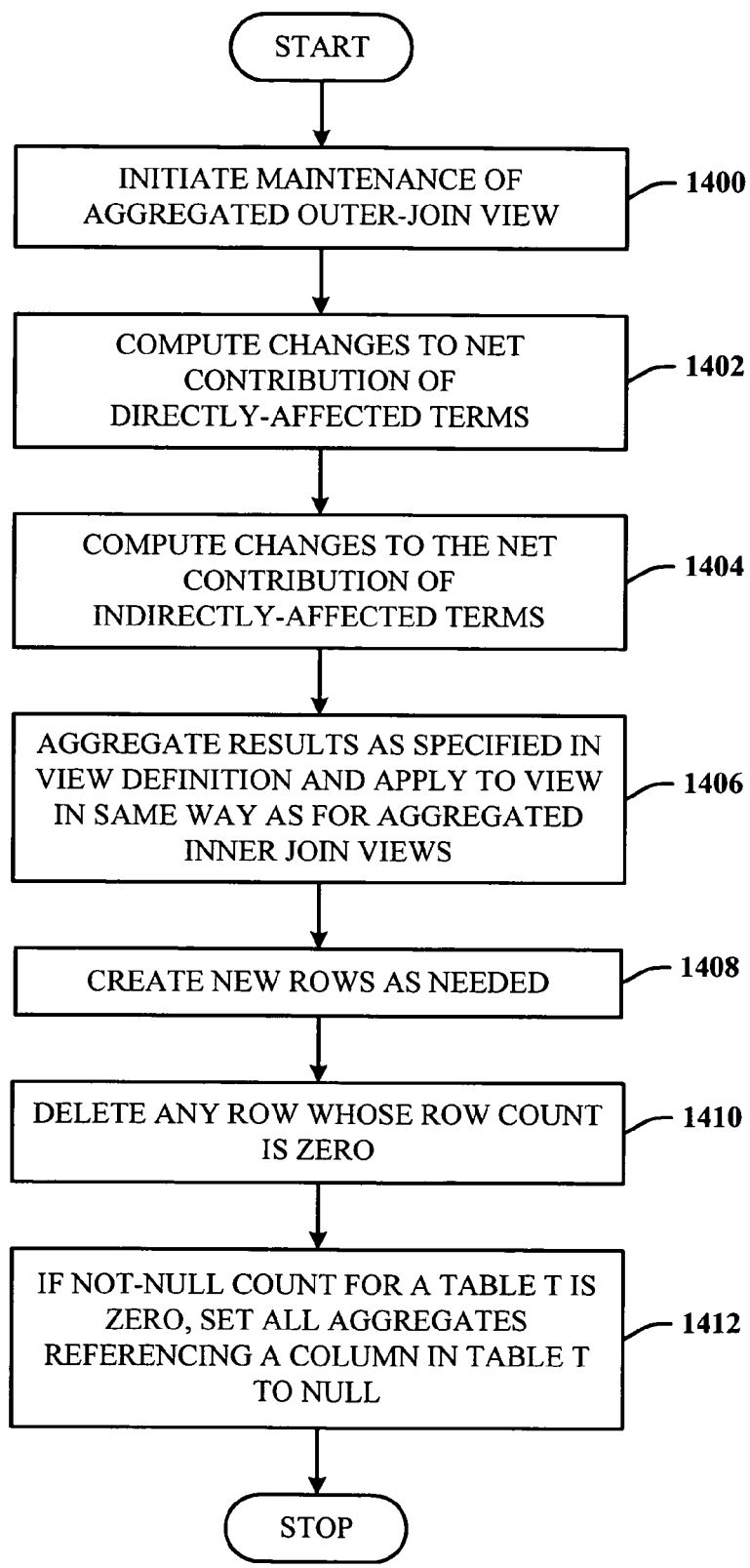
FIG. 14 illustrates a flow diagram of a methodology of maintaining an aggregated outer-join view.

FIG. 14 illustrates a flow diagram of a methodology of maintaining an aggregate view. At 1400, initiate maintenance for aggregated outer-join view. At 1402, compute the outer union of changes to the net contribution of directly-affected terms for the non-aggregated part of the view using an expression consisting of left outer joins and inner joins. At 1404, compute the changes to the net contributions of indirectly-affected terms for the non-aggregated part of the part of the view. At 1406, aggregate the results as specified in the view definition, and apply to the view in the same manner as for aggregated inner-join views. At 1408, create new rows as needed. At 1410, delete any row whose row count is zero. At 1412, if a not-null count for a table T becomes zero, all aggregates referencing a column in table T are set to null.

As a brief, but not all-conclusive summary, the innovation extends incremental maintenance algorithms to materialized outer-join views. Construction of maintenance expressions is based on a normal form for outer-join expressions. Maintenance graphs are generated to identify which terms in the normal form may be affected and have to be maintained. The affected terms are divided into two classes, and it is shown how to construct maintenance expressions for each class.

It is within contemplation that a more efficient way to compute $\Delta^2$ may be performed by combining parts of the computations for the different terms by exploiting outer joins, or by saving and reusing partial results, for example.

Figure 15:
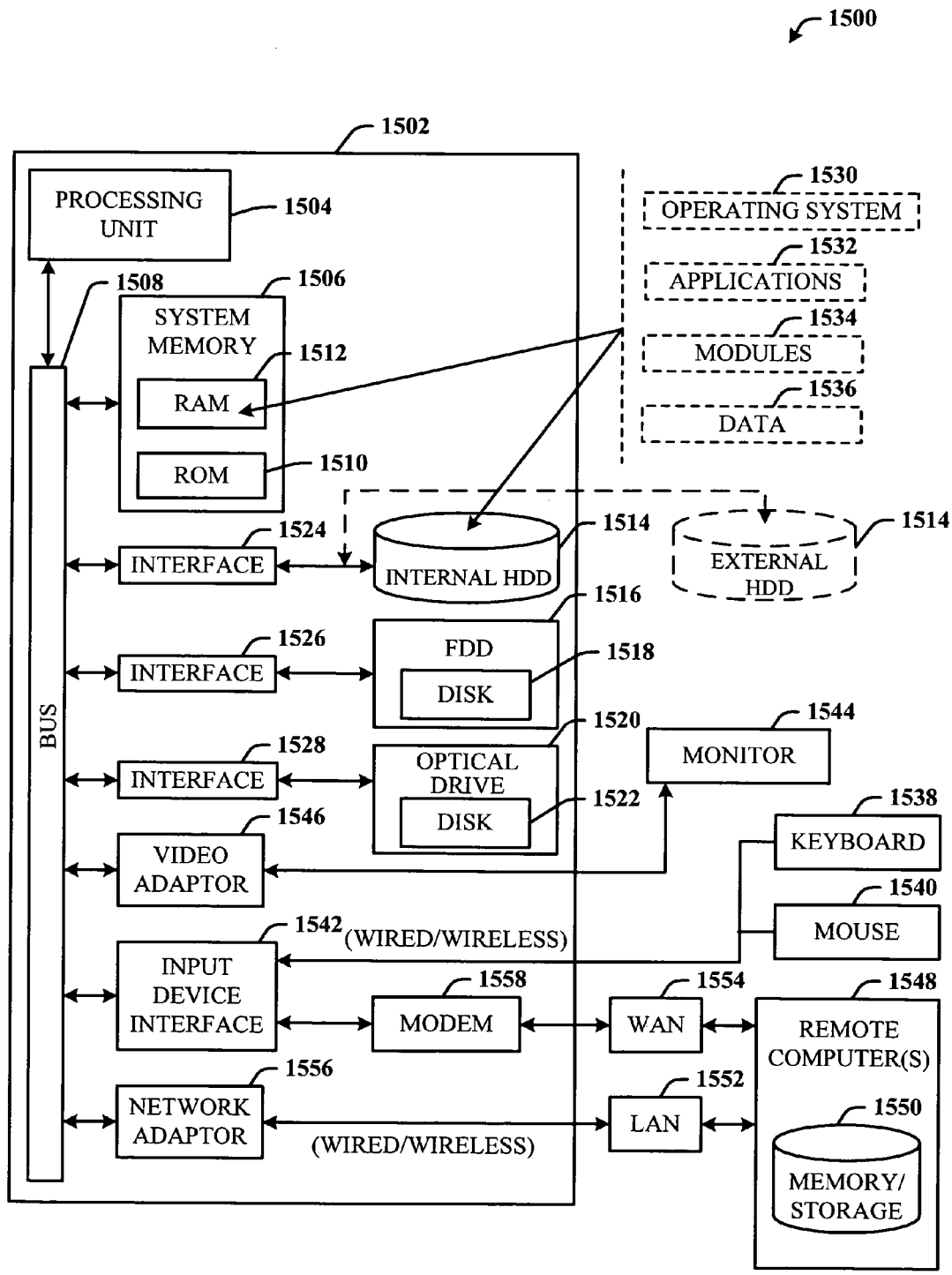
FIG. 15 illustrates a block diagram of a computer operable to execute the disclosed materialized view maintenance architecture.

Referring now to FIG. 15, there is illustrated a block diagram of a computer operable to execute the disclosed materialized view maintenance architecture. In order to provide additional context for various aspects thereof, FIG. 15 and the following discussion are intended to provide a brief, general description of a suitable computing environment 1500 in which the various aspects of the innovation can be implemented. While the description above is in the general context of computer-executable instructions that may run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 15, the exemplary environment 1500 for implementing various aspects includes a computer 1502, the computer 1502 including a processing unit 1504, a system memory 1506 and a system bus 1508. The system bus 1508 couples system components including, but not limited to, the system memory 1506 to the processing unit 1504. The processing unit 1504 can be any of various commercially available processors. Dual microprocessors and other multi-processor architectures may also be employed as the processing unit 1504.

The system bus 1508 can be any of several types of bus structure that may further interconnect to a memory bus (with or without a memory controller), a peripheral bus, and a local bus using any of a variety of commercially available bus architectures. The system memory 1506 includes read-only memory (ROM) 1510 and random access memory (RAM) 1512. A basic input/output system (BIOS) is stored in a non-volatile memory 1510 such as ROM, EPROM, EEPROM, which BIOS contains the basic routines that help to transfer information between elements within the computer 1502, such as during start-up. The RAM 1512 can also include a high-speed RAM such as static RAM for caching data.

The computer 1502 further includes an internal hard disk drive (HDD) 1514 (e.g., EIDE, SATA), which internal hard disk drive 1514 may also be configured for external use in a suitable chassis (not shown), a magnetic floppy disk drive (FDD) 1516, (e.g., to read from or write to a removable diskette 1518) and an optical disk drive 1520, (e.g., reading a CD-ROM disk 1522 or, to read from or write to other high capacity optical media such as the DVD). The hard disk drive 1514, magnetic disk drive 1516 and optical disk drive 1520 can be connected to the system bus 1508 by a hard disk drive interface 1524, a magnetic disk drive interface 1526 and an optical drive interface 1528, respectively. The interface 1524 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 1502, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the disclosed innovation.

A number of program modules can be stored in the drives and RAM 1512, including an operating system 1530, one or more application programs 1532, other program modules 1534 and program data 1536. All or portions of the operating system, applications, modules, and/or data can also be cached in the RAM 1512. It is to be appreciated that the innovation can be implemented with various commercially available operating systems or combinations of operating systems.

A user can enter commands and information into the computer 1502 through one or more wired/wireless input devices, e.g., a keyboard 1538 and a pointing device, such as a mouse 1540. Other input devices (not shown) may include a microphone, an IR remote control, a joystick, a game pad, a stylus pen, touch screen, or the like. These and other input devices are often connected to the processing unit 1504 through an input device interface 1542 that is coupled to the system bus 1508, but can be connected by other interfaces, such as a parallel port, an IEEE 1394 serial port, a game port, a USB port, an IR interface, etc.

A monitor 1544 or other type of display device is also connected to the system bus 1508 via an interface, such as a video adapter 1546. In addition to the monitor 1544, a computer typically includes other peripheral output devices (not shown), such as speakers, printers, etc.

The computer 1502 may operate in a networked environment using logical connections via wired and/or wireless communications to one or more remote computers, such as a remote computer(s) 1548. The remote computer(s) 1548 can be a workstation, a server computer, a router, a personal computer, portable computer, microprocessor-based entertainment appliance, a peer device or other common network node, and typically includes many or all of the elements described relative to the computer 1502, although, for purposes of brevity, only a memory/storage device 1550 is illustrated. The logical connections depicted include wired/wireless connectivity to a local area network (LAN) 1552 and/or larger networks, e.g., a wide area network (WAN) 1554. Such LAN and WAN networking environments are commonplace in offices and companies, and facilitate enterprise-wide computer networks, such as intranets, all of which may connect to a global communications network, e.g., the Internet.

When used in a LAN networking environment, the computer 1502 is connected to the local network 1552 through a wired and/or wireless communication network interface or adapter 1556. The adaptor 1556 may facilitate wired or wireless communication to the LAN 1552, which may also include a wireless access point disposed thereon for communicating with the wireless adaptor 1556.

When used in a WAN networking environment, the computer 1502 can include a modem 1558, or is connected to a communications server on the WAN 1554, or has other means for establishing communications over the WAN 1554, such as by way of the Internet. The modem 1558, which can be internal or external and a wired or wireless device, is connected to the system bus 1508 via the serial port interface 1542. In a networked environment, program modules depicted relative to the computer 1502, or portions thereof, can be stored in the remote memory/storage device 1550. It will be appreciated that the network connections shown are exemplary and other means of establishing a communications link between the computers can be used.

The computer 1502 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11x (a, b, g, etc.) to provide secure, reliable, fast wireless connectivity. A Wi-Fi network can be used to connect computers to each other, to the Internet, and to wired networks (which use IEEE 802.3 or Ethernet).

Wi-Fi networks can operate in the unlicensed 2.4 and 5 GHz radio bands. IEEE 802.11 applies to generally to wireless LANs and provides 1 or 2 Mbps transmission in the 2.4 GHz band using either frequency hopping spread spectrum (FHSS) or direct sequence spread spectrum (DSSS). IEEE 802.11a is an extension to IEEE 802.11 that applies to wireless LANs and provides up to 54 Mbps in the 5 GHz band. IEEE 802.11a uses an orthogonal frequency division multiplexing (OFDM) encoding scheme rather than FHSS or DSSS. IEEE 802.11b (also referred to as 802.11 High Rate DSSS or Wi-Fi) is an extension to 802.11 that applies to wireless LANs and provides 11 Mbps transmission (with a fallback to 5.5, 2 and 1 Mbps) in the 2.4 GHz band. IEEE 802.11g applies to wireless LANs and provides 20+ Mbps in the 2.4 GHz band. Products can contain more than one band (e.g., dual band), so the networks can provide real-world performance similar to the basic 10 BaseT wired Ethernet networks used in many offices.

Figure 16:
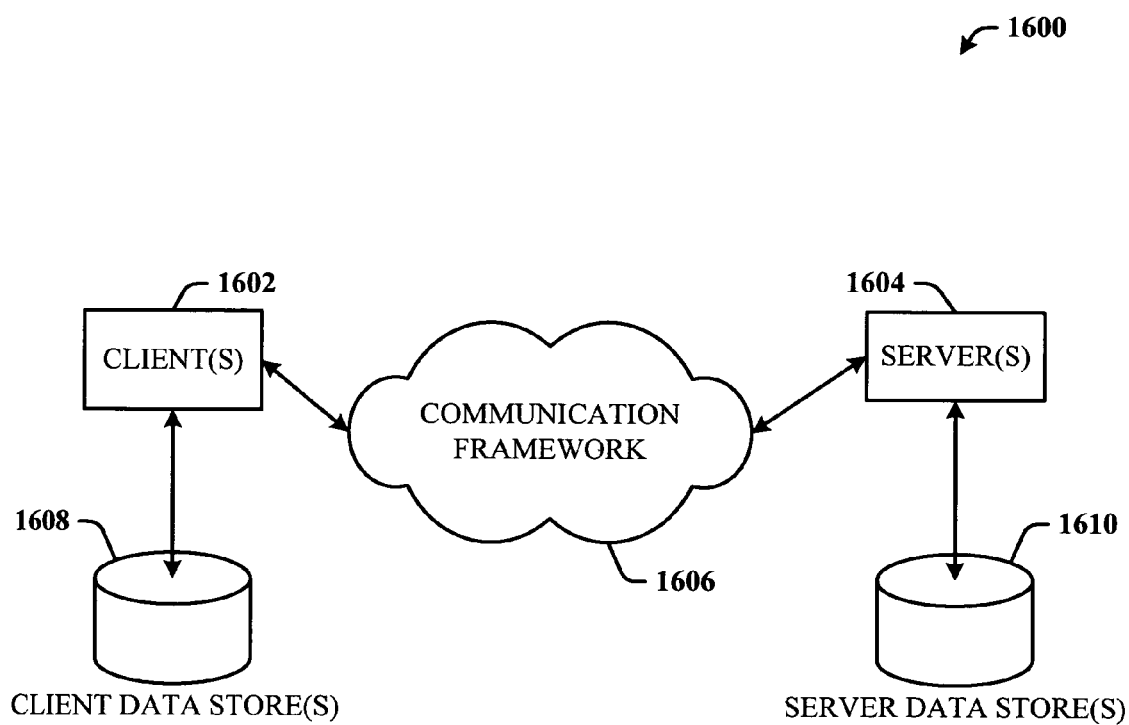
FIG. 16 illustrates a schematic block diagram of an exemplary computing environment operable to maintain materialized views in accordance with another aspect.

Referring now to FIG. 16, there is illustrated a schematic block diagram of an exemplary computing environment 1600 operable to maintain materialized views in accordance with another aspect. The system 1600 includes one or more client(s) 1602. The client(s) 1602 can be hardware and/or software (e.g., threads, processes, computing devices). The client(s) 1602 can house cookie(s) and/or associated contextual information by employing the subject innovation, for example.

The system 1600 also includes one or more server(s) 1604. The server(s) 1604 can also be hardware and/or software (e.g., threads, processes, computing devices). The servers 1604 can house threads to perform transformations by employing the invention, for example. One possible communication between a client 1602 and a server 1604 can be in the form of a data packet adapted to be transmitted between two or more computer processes. The data packet may include a cookie and/or associated contextual information, for example. The system 1600 includes a communication framework 1606 (e.g., a global communication network such as the Internet) that can be employed to facilitate communications between the client(s) 1602 and the server(s) 1604.

Communications can be facilitated via a wired (including optical fiber) and/or wireless technology. The client(s) 1602 are operatively connected to one or more client data store(s) 1608 that can be employed to store information local to the client(s) 1602 (e.g., cookie(s) and/or associated contextual information). Similarly, the server(s) 1604 are operatively connected to one or more server data store(s) 1610 that can be employed to store information local to the servers 1604.

What has been described above includes examples of the disclosed innovation. It is, of course, not possible to describe every conceivable combination of components and/or methodologies, but one of ordinary skill in the art may recognize that many further combinations and permutations are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented system that facilitates maintenance of a materialized outer-join view, comprising:
    a view creation component for creating a materialized view definition that includes at least one outer join of data in at least one base table for inclusion in the materialized outer-join view; and
    a maintenance component for updating at least a stored materialized selection, projection, and outer-join (SPOJ) view result associated with the materialized view definition, wherein the maintenance component determines which base table outer-join relationships are affected by a change in the at least one base table and wherein the update to the SPOJ view materialization reflects changes associated with the results of the at least one outer-join of data with the at least one base table based at least in part on the determination of a change in the base table affecting an outer join relationship.

2. The system of claim 1, wherein the materialized view definition further comprises at least one of a one-sided outer join and a full outer join.

3. The system of claim 1, further comprising a conversion component for converting an outer-join view expression into a normal form.

4. The system of claim 3, wherein the normal form is a join-disjunctive normal form.

5. The system of claim 4, wherein the conversion component utilizes a foreign key constraint for reducing a number of terms in the normal form of the outer-join view expression.

6. The system of claim 3, wherein the conversion component computes a subsumption graph that models subsumption relationships among terms in the normal form.

7. The system of claim 1, wherein the maintenance component computes net contribution of a term of a normalized view expression.

8. The system of claim 1, wherein the maintenance component identifies terms affected by an update.

9. The system of claim 1, wherein the maintenance component distinguishes whether an expression term is directly affected, indirectly affected, and not affected.

10. The system of claim 1, wherein the maintenance component creates a view maintenance graph that incorporates classification of terms as directly affected, indirectly affected, or not affected.

11. The system of claim 1, wherein the maintenance component updates a base table, and if there are directly-affected terms, computes and applies an outer union of all changes to the net contributions of the directly-affected terms.

12. The system of claim 1, wherein the maintenance component updates a base table, and if there are indirectly-affected terms, computes and applies an outer union of all changes to net contributions of the indirectly-affected terms.

13. A computer-implemented method of maintaining a materialized view, comprising:
    creating a materialized view definition that includes at least one outer join of data in at least one base table for inclusion in the materialized view, the materialized view definition associated with a stored materialized view result;
    initiating update processing due to a change in an underlying base table of a database;
    converting a selection, projection, and outer-join (SPOJ) part of the materialized view definition into a normal form;
    outputting one or more statements that update the materialized view result, wherein the output includes statements related to changes to contributing base table outer-joins that are affected by a change in the at least one base table; and
    processing the one or more statements to incrementally update the materialized view result, wherein the update reflects changes associated with the results of the at least one contributing outer-join of the data in the at least one base table based at least in part on the related statements.

14. The method of claim 13, further comprising an act of computing a set of new tuples for insertion into the materialized view and storing the set in a temporary table.

15. The method of claim 13, further comprising an act of identifying terms affected by the update, and classifying the terms as one of directly-affected, indirectly-affected, and not affected.

16. The method of claim 13, further comprising an act of computing a change to the net contribution of each term.

17. The method of claim 13, further comprising an act of deriving maintenance expressions for insertions and deletions taking into account effects of foreign-key constraints, which constraints facilitate elimination of nodes from a maintenance graph.

18. The method of claim 13, further comprising an act of deriving an expression for computing a change to a net contribution of a directly-affected term, which expression includes one-sided outer joins and inner joins.

19. The method of claim 13, further comprising an act of computing a change to a net contribution of an indirectly-affected term of the view definition.

20. A computer-implemented system of maintaining a materialized view, comprising:
    computer-implemented means for creating a materialized view definition that includes multiple outer-joins between data in at least one underlying base table;
    computer-implemented means for detecting a change in the at least one underlying base table relating to an outer-join contributing to the materialized view;
    computer-implemented means for converting a selection, projection, and outer-join (SPOJ) portion of the materialized view definition into a join-disjunctive normal form;

computer-implemented means for processing a foreign-key constraint;

computer-implemented means for generating one or more statements for processing an update to results of the materialized view definition, wherein the statements include changes related to contributing base table outer-joins that are affected by a change in the at least one base table; and computer-implemented means for processing the one or more statements to incrementally update the results of the materialized view definition, wherein the update reflects changes associated with the results of the contributing outer-joins of the data in the at least one base table.

21. A computer-implemented system of maintaining a materialized view, comprising:

a view creation component for creating a materialized view definition that includes multiple outer-joins between data in at least one underlying base table;

a conversion component for at least detecting a change in an underlying base table, converting any selection, projection and outer-join (SPOJ) portion of the materialized view definition into a join-disjunctive normal form, processing any foreign-key constraints, and generating one or more statements for processing an incremental update to results of the materialized view definition, wherein the statements include changes related to underlying base table outer-joins that are affected by a change in the at least one underlying base table; and a maintenance component for processing the one or more statements to incrementally update the results of the materialized view definition, wherein the update reflects changes associated with the results of the contributing outer-joins of the data in the at least one underlying base table based at least in part on the related statements.

* * * * *